United States Patent [19]

Lee et al.

[11] Patent Number: 5,762,681
[45] Date of Patent: Jun. 9, 1998

[54] FLUIDIZED BED TYPE REDUCTION APPARATUS FOR IRON ORES AND METHOD FOR REDUCING IRON ORES USING THE APPARATUS

[75] Inventors: Il Ock Lee; Yong Ha Kim; Hang Goo Kim; Bong Jin Jung; Uoo Chang Chung, all of Pohang, Rep. of Korea; Werner L. Kepplinger, Leonding, Austria; Felix Wallner; Johannes L. Schenk, both of Linz, Austria

[73] Assignees: Pohang Iron & Steel Co., Ltd.; Research Institute of Industrial Science & Technology, both of Kyongsangbook-Do, Rep. of Korea; Voest-Alpine Industrieanlagenbau GmbH, Linz, Austria

[21] Appl. No.: 696,973
[22] PCT Filed: Dec. 28, 1995
[86] PCT No.: PCT/KR95/00181
 § 371 Date: Oct. 28, 1996
 § 102(e) Date: Oct. 28, 1996
[87] PCT Pub. No.: WO96/21044
 PCT Pub. Date: Jul. 11, 1996

[30] Foreign Application Priority Data

Dec. 29, 1994 [KR] Rep. of Korea ............ 1994-38980
Dec. 30, 1994 [KR] Rep. of Korea ............ 1994-40112

[51] Int. Cl.⁶ ............................... C21B 13/14; C22B 5/14
[52] U.S. Cl. ............................................ 75/446; 266/172
[58] Field of Search ........................... 75/446; 266/172

[56] References Cited

U.S. PATENT DOCUMENTS

| | | | |
|---|---|---|---|
| 4,434,001 | 2/1984 | Edstrom | 75/3 |
| 5,082,251 | 1/1992 | Whipp | 266/144 |
| 5,370,727 | 12/1994 | Whipp | 75/436 |
| 5,554,206 | 9/1996 | Czermak et al. | 75/446 |

FOREIGN PATENT DOCUMENTS 1114653  8/1989  Japan.

*Primary Examiner*—Melvyn Andrews
*Attorney, Agent, or Firm*—Webb Ziesenheim Bruening Logsdon Orkin & Hanson, P.C.

[57] ABSTRACT

A three-stage, fluidized-bed-type reduction apparatus and a method for using it for reducing fine iron ores of wide size ranges, improving the gas utilization and reduction degree, reducing the residence time of iron ores, and increasing the prereduction rate of reduced iron. The apparatus includes serially arranged a drying/preheating furnace with a first cyclone connected to it, a primary prereduction furnace with a second cyclone connected to it, a secondary high-gas-velocity reduction furnace for finally reducing only a coarse ore portion of the prereduced iron ores at a bubbling fluidized state while carrying over the medium/fine ore portion of the iron ores, a secondary low-gas-velocity reduction furnace for finally reducing the medium/fine ores forming a bubbling fluidized bed thereof, an inner cyclone installed in the secondary low-gas-velocity reduction furnace, and a third cyclone for capturing dusty ores not captured by the inner cyclone.

44 Claims, 7 Drawing Sheets

FLUIDIZED BED TYPE REDUCTION APPARATUS FOR IRON ORES AND METHOD FOR REDUCING IRON ORES USING THE APPARATUS

BACKGROUND OF THE INVENTION

1. Field of the Invention

The present invention relates to a fluidized-bed-type reduction apparatus for reducing fine iron ores in the procedure of producing pig iron or ingot iron and a method for reducing fine iron ores using such an apparatus, and more particularly to a fluidized-bed-type reduction apparatus capable of efficiently reducing fine iron ores of wide size ranges in a stably fluidized state and a method for reducing fine iron ores using the apparatus.

2. Description of the Prior Art

Generally, conventional methods for producing pig iron from reduced iron ores include a method using blast furnaces and a method using shaft furnaces. In the latter method, iron ores reduced in a shaft furnace are melted in an electric furnace.

In the case of the method for producing pig iron using blast furnaces, a large amount of coke is used as a heat source and reducing agent. In accordance with this method, iron ores are charged in the form of sintered ores in order to improve the gas-permeability and reduction.

To this end, conventional methods using blast furnaces need a coke oven for producing coking coal and equipment for producing sintered ores. For this reason, the method using blast furnaces is a method requiring a huge investment and high energy consumption. Since high quality coking coal is maldistributed in the world and the amount of its reserves are diminishing, the shortage thereof becomes severe as the demand for steel increases. On the other hand, the method of reducing iron ores using shaft furnaces requires a pre-treating step for pelletizing iron ores. Since this method also uses natural gas as a heat source and reducing agent, it has a drawback that it can be commercially implemented only in areas where an easy supply of natural gas is ensured.

Recently, a smelting reduction method capable of producing ingot iron from iron ores using non-coking coal in place of coke has been remarkable as a new iron production method. Such a smelting reduction method typically employs a system wherein iron ores pre-reduced in a separate furnace are completely reduced in a melting furnace to produce hot metal.

In the reduction furnace, iron ores are reduced in a solid phase before they are melted. In other words, iron ores charged in the reduction furnace are reduced while being in contact with hot reducing gas generated in the melting furnace.

The reduction process used in this method is classified into two types, a moving bed type and a fluidized bed type, depending on the condition how iron ores are in contact with the reducing gas. It has been known that one of the most promising methods for the reduction of fine ore ores of wide size distribution is the fluidized-bed-type process wherein the ores are reduced in a fluidized state by a reducing gas supplied through a distributor which is installed in the lower part of the reaction furnace.

An example of the fluidized-bed-type reduction furnace is disclosed in Japanese Utility Model Application Laid-open No. Hei-1-114653, and its construction is illustrated in FIG. 1. As shown in FIG. 1, this furnace includes a cylindrical furnace body 1 in which fine iron ores are reduced. The cylindrical furnace body 1 is provided with an ore inlet 2, a reducing gas inlet 3, an reduced ore outlet 4, and an exhaust gas outlet 5.

In this fluidized-bed-type furnace, fine iron ores are first charged into the cylindrical furnace body 1 through the ore inlet 2. When a reducing gas is supplied in the furnace through a gas distributor 6 at an appropriate flow rate, the iron ores form a fluidized bed above the distributor so that they can be mixed and agitated with the reducing gas, and in this state the iron ores can be reduced by the reducing gas. The reducing gas supplied in the reduction furnace forms bubbles in a layer of iron ores as if a fluid is boiled and then rises through the particle layer, thereby forming a bubbling fluidized bed. The reduced iron ores are discharged from the furnace through the ore outlet 4 and then fed to a melter gasifier.

For this fluidized-bed-type reduction apparatus, it is necessary to minimize the flow rate of the reducing gas while forming an effective fluidized bed so as not only to reduce the elutriation of iron ores, but also to increase the efficiency of the reducing gas. To this end, the grain size of iron ores should be strictly limited to a certain range. In other words, the flow rate of the reducing gas required to form an effective fluidized bed is strongly dependent upon the grain size of iron ores to be reduced. As the result, it is impossible to treat iron ores of wide grain size ranges. For this reason, the grain size of iron ores to be charged in the above-mentioned fluidized bed type furnace is limited typically to 1 mm or below. However, at least 50% of iron ores supplied as a raw material in iron making industry is in the size of larger than 1 mm.

In such a fluidized-bed-type reduction furnace, therefore, iron ores are screened in terms of their grain size before using, and those of a larger grain size are charged either into the reduction furnace after being pulverized to a required grain size or directly into a shaft furnaces having the above-mentioned drawback. As the result, there is an increase in installation cost due to an increase in the number of processing steps.

The inventors proposed the present invention which can solve the above-mentioned problems encountered in the conventional methods based on the results of their research and experiments.

SUMMARY OF THE INVENTION

Therefore, an object of the invention is to provide a three-stage, fluidized-bed-type reduction apparatus which includes a single-type drying/preheating furnace for drying and preheating iron ores, a single-type primary reduction furnace for pre-reducing the fine iron ores, and twin-type final reduction furnace for finally reducing iron ores, thereby being capable of efficiently reducing iron ores of wide size ranges in a stably fluidized state, maximizing the gas use rate in its fluidized-bed-type reduction furnaces, reducing the residence time of iron ores, and increasing the production rate of reduced iron, and to provide an optimal method for reducing the fine iron ores using this apparatus.

Another object of the invention is to provide a fluidized-bed-type reduction apparatus which includes a drying/preheating furnace for drying and preheating iron ores and twin type reduction furnaces for primarily and finally reducing the iron ores, thereby being capable of efficiently reducing fine iron ores of wide size ranges in a stably fluidized state, achieving a uniform reduction irrespective of the grain size of iron ores, and improving the reduction rate, gas use rate and gas consumption rate, and to provide an optimal method for reducing the fine iron ores using this apparatus.

In accordance with one aspect, the present invention provides a fluidized bed type reduction apparatus for reducing fine iron ores of wide size distribution, comprising: a drying/preheating furnace for drying and preheating iron ores supplied from a hopper; a first cyclone for capturing dusty iron ores contained in exhaust gas from the drying/ preheating furnace; a primary reduction furnace for prereducing the dried/preheated iron ores and dust ores captured by the first cyclone in a bubbling fluidized state; a second cyclone for capturing dusty iron ores contained in exhaust gas from the primary reduction furnace; a secondary high-gas-velocity reduction furnace for finally reducing only a coarse ore portion of the pre-reduced iron ores in a bubbling fluidized state while elutriating a medium/fine ore portion of the iron ores; a secondary low-gas-velocity reduction furnace for finally reducing the medium/fine ores elutriated from the secondary high-gas-velocity reduction furnace while forming a bubbling fluidized bed thereof; and a third cyclone for capturing dusty ores contained in exhaust gas from the secondary low-gas-velocity ore reduction furnace.

In accordance with another aspect, the present invention provides a fluidized-bed-type reduction apparatus for reducing fine iron ores of wide size distribution, comprising: a drying/preheating furnace for drying and preheating iron ores supplied from a hopper; a first cyclone for capturing dusty iron ores contained in exhaust gas from the drying/ preheating furnace; a primary high-gas-velocity reduction furnace for primarily reducing (pre-reducing) only a coarse ore portion of the preheated iron ores discharged from the drying/preheating furnace at a bubbling fluidized state while elutriating a medium/fine ore portion of the preheated iron ores; a primary low-gas-velocity reduction furnace for prereducing the medium/fine iron ores elutriated from the primary high-gas-velocity reduction furnace while forming a bubbling fluidized bed thereof; a second-cyclone for capturing dusty iron ores contained in exhaust gas from the primary low-gas-velocity reduction furnace; a secondary high-gas-velocity reduction furnace for finally reducing the coarse iron ores prereduced in the primary high-gas-velocity reduction furnace while forming a bubbling fluidized bed thereof; a secondary low-gas-velocity reduction furnace for finally reducing the medium/fine iron ores pre-reduced in the primary low-gas-velocity reduction furnace while forming a bubbling fluidized bed thereof; a third cyclone for capturing dusty iron ores contained in exhaust gas from the secondary low-gas-velocity reduction furnace, the third cyclone recirculating the captured dusty iron ores to either a lower portion of the secondary low-gas-velocity reduction furnace or a lower portion of a melter gasifier; and a fourth cyclone for capturing dusty ores contained in exhaust gas from the secondary high-gas-velocity reduction furnace.

In accordance with another aspect, the present invention provides a method for reducing fine iron ores of wide size distribution, comprising the steps of: drying and preheating iron ores supplied from a hopper in a drying/ preheating furnace; pre-reducing the dried/preheated iron ores in a primary reduction furnace; finally reducing a coarse ore portion of the pre-reduced iron ores in a secondary high-gas-velocity reduction furnace while forming a bubbling fluidized bed thereof; and finally reducing a medium/fine ore portion of the pre-reduced iron ores in a secondary low-gas-velocity reduction furnace while forming a bubbling fluidized bed thereof.

In accordance with another aspect, the present invention provides a method for reducing fine iron ores of wide size distribution, comprising the steps of: drying and preheating iron ores supplied from a hopper in a drying/preheating furnace; pre-reducing a coarse ore portion of the dried/ preheated iron ores in a primary high-gas-velocity reduction furnace while forming a bubbling fluidized bed thereof; pre-reducing a medium/fine ore portion of the dried/ preheated iron ores in a primary low-gas-velocity reduction furnace; finally reducing the pre-reduced coarse iron ores in a secondary high-gas-velocity reduction furnace while forming a bubbling fluidized bed thereof; and finally reducing the pre-reduced medium/fine iron ores in a secondary low-gas-velocity reduction furnace while forming a bubbling fluidized bed thereof.

BRIEF DESCRIPTION OF THE DRAWINGS

Other objects and aspects of the invention will become apparent from the following description of embodiments in conjunction with the accompanying drawings in which.

DETAILED DESCRIPTION OF THE PREFERRED EMBODIMENTS

Figure 1:
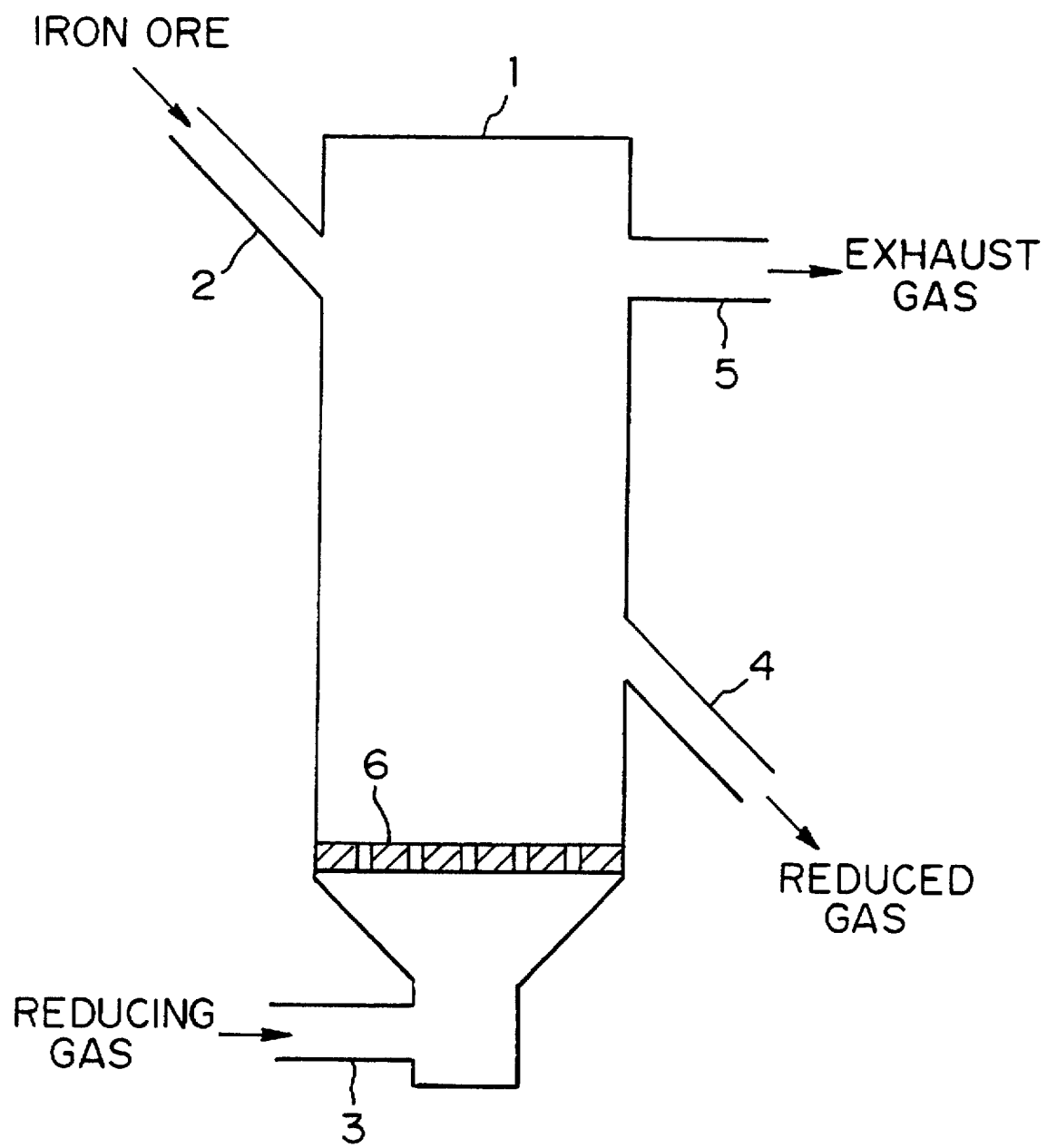
FIG. 1 is a schematic diagram illustrating a conventional fluidized-bed-type reduction furnace for reducing iron ores.
Figure 2:
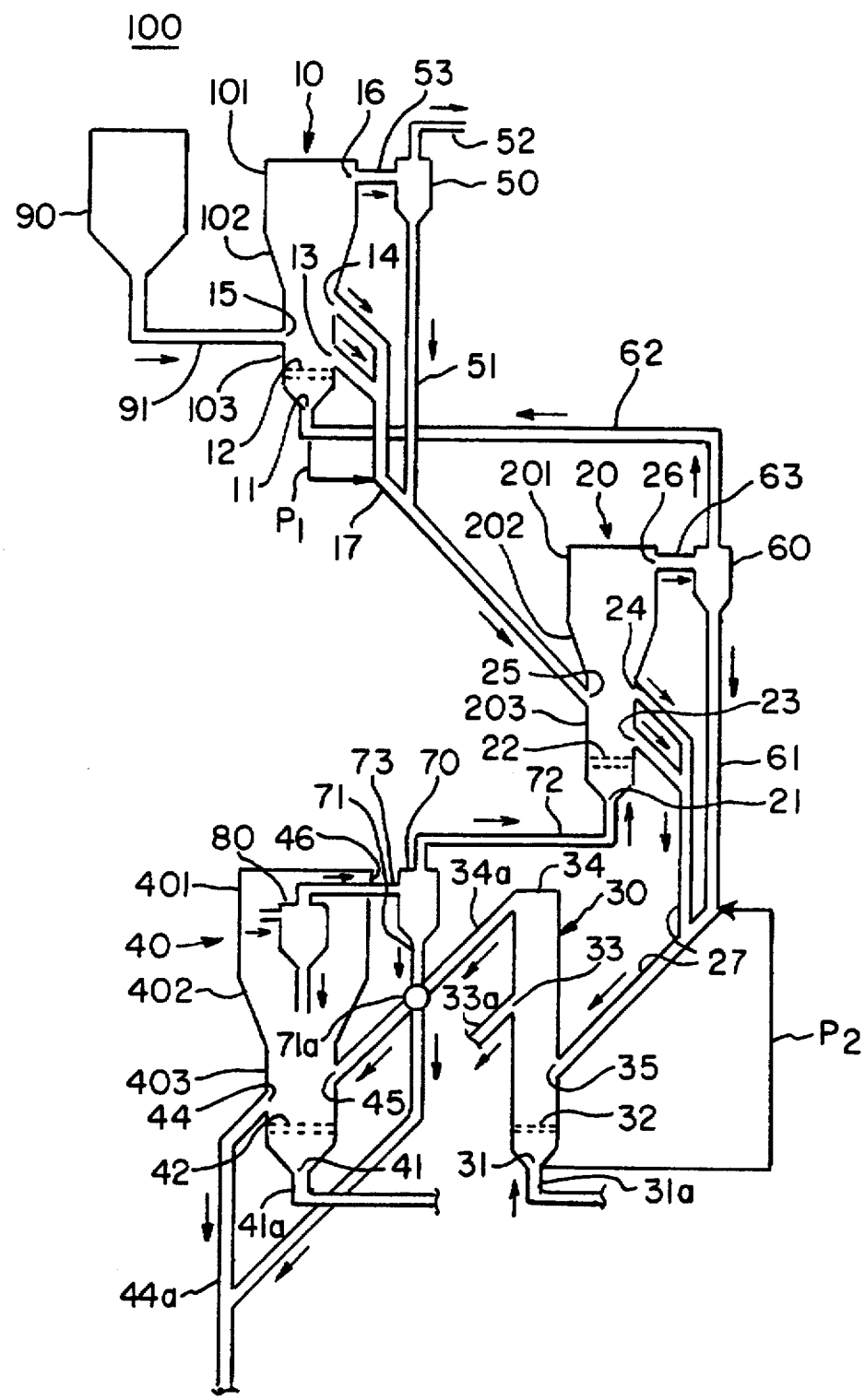
FIG. 2 is a schematic diagram illustrating a fluidized bed-type reduction apparatus for reducing fine iron ores of wide size distribution in accordance with an embodiment of the present invention.

In FIG. 2, a fluidized-bed-type reduction apparatus for reducing fine iron ores of wide size distribution in accordance with the present invention is illustrated.

As shown in FIG. 2, the fluidized-bed-type reduction apparatus includes a drying/preheating furnace 10 for drying and preheating iron ores supplied from a hopper 90, a primary reduction furnace 20 for pre-reducing the dried/ preheated iron ores from the drying/preheating furnace 10, a secondary high-gas-velocity reduction furnace 30 for finally reducing a coarse ore portion of the iron ores prereduced in the primary reduction furnace by forming a bubbling fluidized bed thereof while elutriating a medium/ fine ore portion of the iron ores into a secondary low-gas-velocity reduction furnace 40 for finally reducing the medium/fine iron ores supplied from the secondary high-gas-velocity reduction furnace 30 while forming a bubbling fluidized bed thereof.

The drying/preheating furnace 10 has a enlarged-upper-reduced-lower cylindrical body in which the diameter of its lower portion is smaller than that of its upper portion. That is, the body of the drying/preheating furnace 10 includes an enlarged upper-cylindrical section 101, an intermediate tapered section 102 of which diameter increases smoothly from its lower end to its upper end, and a reduced lower-cylindrical section 103. The drying/preheating furnace 10 is provided at the bottom portion with a first gas inlet 11 for receiving exhaust gas from the primary reduction furnace 20. A first gas distributor 12 is installed at the lower section 103 of the drying/preheating furnace 10 to evenly distribute the exhaust gas supplied through the first gas inlet 11 in the drying/preheating furnace 10.

The drying/preheating furnace 10 is also provided at the side wall of its lower section 103 with a first ore inlet 15 for receiving iron ores from the hopper 90, a first coarse ore outlet 13 for discharging a coarse ore portion of the dried/preheated iron ores from the drying/preheating furnace 10 and a first medium/fine ore outlet 14 for discharging a medium/fine ore portion of the dried/preheated iron ores from the drying/preheating furnace 10. A first exhaust gas outlet 16 is provided at the side wall of the upper section 101 to discharge exhaust gas from the drying/preheating furnace 10.

The first ore inlet 15 is connected to the hopper 90 via an ore supply line 91 so that iron ores can be fed therethrough. The first exhaust gas outlet 16 is connected to a first cyclone 50 via a first exhaust gas line 53. Both the first coarse and medium/fine ore outlets 13 and 14 are connected to the primary reduction furnace 20 via a first duct line 17 so that iron ores can be fed therethrough. The first cyclone 50 has a first dusty ore discharge line 51 and a first cleaned gas discharge line 52. The first dusty ore discharge line 51 is connected at one end thereof to the first duct line 17 so that iron ores are fed therethrough.

Preferably, a first purging gas line $P_1$, which stems from a second cleaned gas discharge line 62 of the primary reduction furnace 20, is connected to a bended portion of the first duct line 17 so as to supply a small amount of purging gas to the first duct line 17, thereby preventing the duct line 17 from being plugged by iron ores being fed in the line 17. For the same purpose, another purging gas line (not shown) connected to the second cleaned gas discharge line 62 may be connected to a bended portion of the first dusty ore discharge line 51.

Similarly to the drying/preheating furnace 10, the primary reduction furnace 20 has a enlarged-upper-reduced-lower cylindrical furnace body in which the diameter of its lower portion is smaller than that of its upper portion. That is, the body of the primary reduction furnace 20 includes an enlarged upper-cylindrical section 201, an intermediate tapered section 202 of which diameter increases smoothly from its lower end to its upper end, and a reduced lower-cylindrical section 203. The primary reduction furnace 20 is provided at the bottom portion thereof with a second gas inlet 21 for receiving exhaust gas from the secondary low-gas-velocity reduction furnace 40. A second gas distributor 22 is installed at the lower section 203 of the primary reduction furnace 20 to evenly distribute the exhaust gas supplied through the second gas inlet 21 in the primary reduction furnace 20.

The primary reduction furnace 20 is also provided at the side wall of its lower section 203 with a second ore inlet 25 for receiving iron ores from the drying/preheating furnace 10, a second coarse ore outlet 23 for discharging a coarse ore portion of the pre-reduced iron ores from the primary reduction furnace 20 and a second medium/fine ore outlet 24 for discharging a medium/fine ore portion of the pre-reduced iron ores from the primary reduction furnace 20. A second exhaust gas outlet 26 is provided at the side wall of the upper section 201 to discharge exhaust gas from the primary reduction furnace 20.

The second ore inlet 25 is connected to the drying/preheating furnace 10 via the first circulation line 17 so as to receive the dried/preheated iron ores from the drying/preheating furnace 10. The second exhaust gas outlet 26 is connected to a second cyclone 60 via a second exhaust gas line 63 so that exhaust gas is fed therethrough. Both the second coarse and medium/fine ore outlets 23 and 24 are connected to the secondary high-gas-velocity reduction furnace 30 via a second duct line 27 so that iron ores are fed therethrough. To the bottom portion of the second cyclone 60, a second dusty ore discharge line 61 is connected at its one end. The second clean gas discharge line 62 which branch out the first purging gas line $P_1$ is connected at one end thereof to the top portion of the second cyclone 60. The second dusty ore discharge line 61 is connected at the other end thereof to the second duct line 27. Preferably, a second purging gas line $P_2$, which stems from a first reducing gas supply line 31a of the secondary high-gas-velocity reduction furnace 30, is connected to a bended portion of the second dusty ore discharge line 61 so as to supply a small amount of purging gas to the line 61, thereby preventing the line 61 from being plugged by iron ores being fed in the line 61. For the same purpose, another purging gas line (not shown) connected to the first reducing gas supply line 31a may be connected to a bended portion of the second duct line 27.

The second cleaned gas discharge line 62 is connected to the first gas inlet 11 of the drying/preheating furnace 10. On the other hand, the second duct line 27 is connected at one end thereof to a third ore inlet 35 of the secondary high-gas-velocity reduction furnace 30 in order to supply the pre-reduced iron ores from the primary reduction furnace 20.

Meanwhile, the secondary high-gas-velocity reduction furnace 30 has a cylindrical body having a uniform diameter throughout its length. The secondary high-gas-velocity reduction furnace 30 is provided at the bottom portion thereof with a third gas inlet 31 for receiving a reducing gas from a reducing gas source (not shown). A third gas distributor 32 is installed at the lower portion of the secondary high-gas-velocity reduction furnace 30 to distribute the reducing gas supplied through the third gas inlet 31 in the secondary high-gas-velocity reduction furnace 30. At one side of the lower portion of the secondary high-gas-velocity reduction furnace 30, a third ore inlet 35 is provided to receive the pre-reduced iron ores from the primary reduction furnace 20 along with dusty iron ores captured by the first cyclone 60. The third gas inlet 31 is connected to the first reducing gas supply line 31a which is connected to the reducing gas source (not shown).

The secondary high-gas-velocity reduction furnace 30 also has a third coarse ore outlet 33 for outwardly discharging a coarse ore portion of the finally reduced iron ores in the secondary high-gas-velocity reduction furnace 30, and a third medium/fine ore outlet 34 for discharging(elutriating) a medium/fine ore portion of the finally reduced iron ores from the secondary high-gas-velocity reduction furnace 30 to the secondary low-gas-velocity reduction furnace 40 along with exhaust gas from the secondary high-gas-velocity reduction furnace 30. To the third coarse ore outlet 33, a third coarse ore discharge line 33a is connected. On the other hand, the third medium/fine ore outlet 34 is connected to a secondary low-gas-velocity reduction furnace 40 via a third medium/fine ore discharge line 34a.

The secondary low-gas-velocity reduction furnace 40 has a enlarged-upper-reduced-lower cylindrical body in which the diameter of its lower portion is smaller than that of its upper portion. That is, the body of the secondary medium/fine ore reduction furnace 40 includes an enlarged upper-cylindrical section 401, an intermediate tapered section 402 of which diameter increases smoothly from its lower end to its upper end, and a reduced lower-cylindrical section 403. The secondary low-gas-velocity reduction furnace 40 is provided at the bottom portion thereof with a fourth gas inlet 41 for receiving a reducing gas from a reducing gas source (not shown). A fourth gas distributor 42 is stalled at the lower section 403 of the secondary low-gas-velocity reduction furnace 40 to homogeneously distribute the reducing gas supplied through the fourth gas inlet 41 in the secondary low-gas-velocity reduction furnace 40. The fourth gas inlet 41 is connected to a second reducing gas supply line 41a communicating with the reducing gas source (not shown) so that a reducing gas can be fed therethrough. The second reducing gas supply line 41a may be merged with the first reducing gas supply line 31a.

The secondary low-gas-velocity reduction furnace 40 is also provided at the side wall of its lower section 403 with a third medium/fine ore outlet 44 for outwardly discharging medium/fine iron ores finally reduced in the secondary low-gas-velocity reduction furnace 40. Also, the secondary low-gas-velocity reduction furnace 40 is provided at the side wall of its upper section 401 with a third exhaust gas outlet 46 for discharging exhaust gas from the secondary low-gas-velocity reduction furnace 40.

Preferably, an inner cyclone 80 is installed in the secondary low-gas-velocity reduction furnace 40. The secondary low-gas-velocity reduction furnace 40 reduces the medium/fine iron ores received therein at a bubbling fluidized state by the reducing gas merged from the secondary high-gas-velocity reduction furnace 30 and secondary low-gas-velocity reduction furnace 40. At this time, an ultra-fine, namely, dusty portion of the iron ores is elutriated by exhaust gas in the secondary low-gas-velocity reduction furnace 40. The inner cyclone 80 receives the dusty iron ores entrained in the exhaust gas from the secondary low-gas-velocity reduction furnace 40 and separates them from the exhaust gas, and then re-circulates them to the lower portion of the secondary low-gas-velocity reduction furnace 40 while discharging the exhaust gas to a third cyclone 70 via a third exhaust gas line 73.

The fourth medium/fine ore outlet 44 is connected to a reduced iron storing vessel (not shown) via a third duct line 44a. The third exhaust gas line 73 is connected to the third cyclone 70 through the third exhaust gas outlet 46.

The third cyclone 70 is connected at its bottom portion to one end of a third dusty ore discharge line 71 and at its top portion to one end of a third cleaned gas discharge line 72. The other end of the third dusty ore discharge line 71 is connected to the third duct line 44a. The third dusty ore discharge line 71 intersects with the third medium/fine ore discharge line 34a. Preferably, a bi-directional discharge valve 71a is installed at the intersection between the lines 34a and 71 so that the dusty iron ores captured in the third cyclone 70 can be re-circulated to the lower portion of the secondary low-gas-velocity reduction furnace 40 or supplied to a subsequent stage.

If the secondary low-gas-velocity reduction furnace 40 does not include the inner cyclone 80, the third cyclone 70 is directly connected to the secondary low-gas-velocity reduction furnace 40 via the third exhaust gas line 73.

Figure 3:
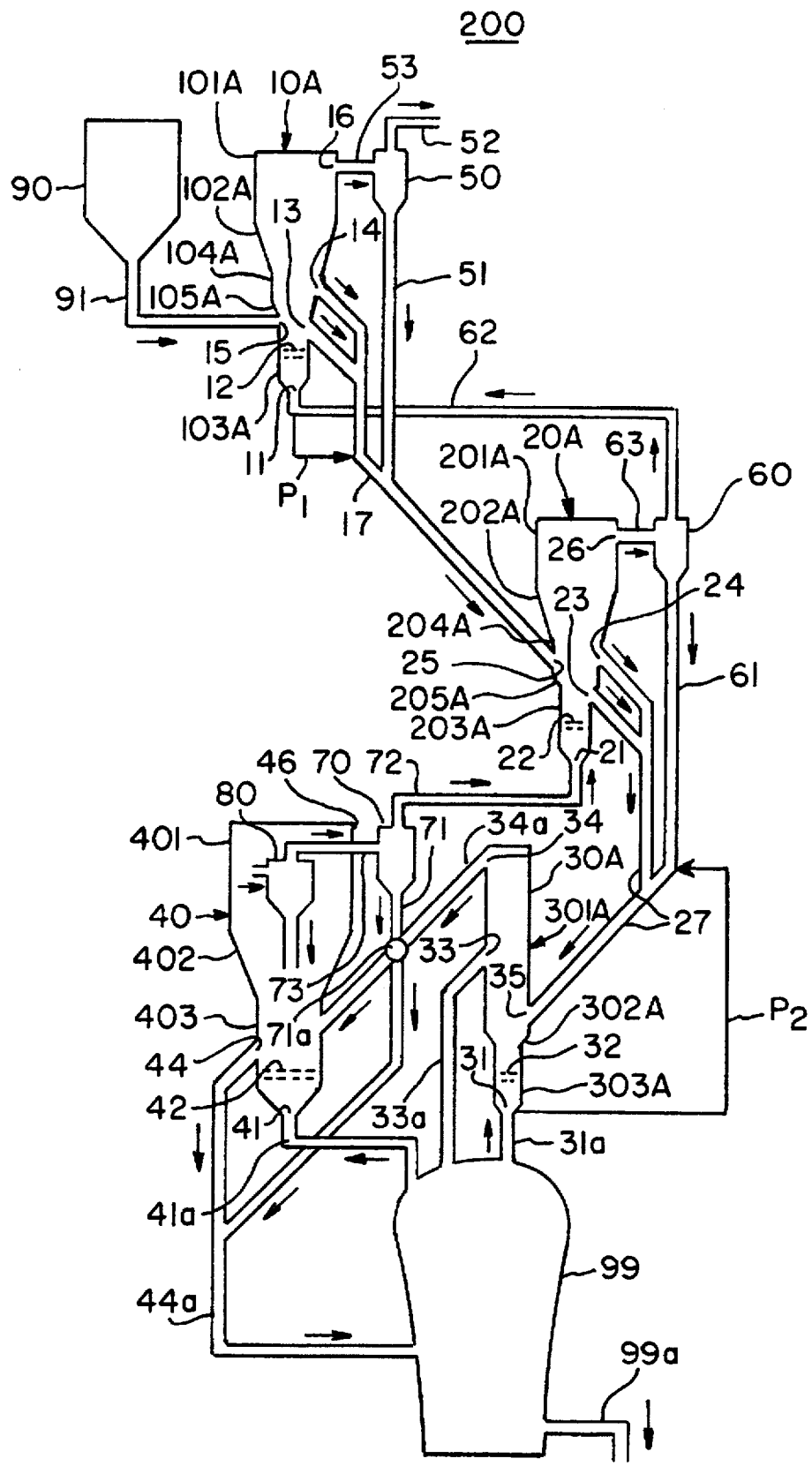
FIG. 3 is a schematic diagram illustrating a fluidized bed-type reduction apparatus for reducing fine iron ores of wide size distribution in accordance with another embodiment of the present invention.

In order to increase the upper limit of grain size of the coarse ore portion of the iron ores to be reduced in the fluidized-bed-type reduction apparatus of the present invention, the drying/preheating furnace 10, primary reduction furnace 20 and secondary coarse ore reduction furnace 30 may have a more reduced dimension at their lower sections. In this connection, FIG. 3 illustrates a fluidized-bed-type reduction apparatus constructed to accommodate an increase in the grain size of the coarse ore portion of iron ores to be reduced in accordance with another embodiment of the present invention. In FIG. 3, elements respectively corresponding to those in FIG. 2 are denoted by the same reference numerals.

As shown in FIG. 3, the fluidized-bed-type reduction apparatus, which is denoted by the reference numeral 200, includes a drying/preheating furnace 10A having a double-tapered cylindrical structure, a primary reduction furnace 20A having a double-tapered cylindrical structure, and a secondary high-gas-velocity reduction furnace 30A having a single-tapered cylindrical structure. That is, the drying/preheating furnace 10A includes an upper section 101A, a first tapered section 102A, an intermediate section 104A, a second tapered Section 105A, and a lower section 103A. Similar to the drying/preheating furnace 10A, the primary reduction furnace 20A includes an upper section 201A, a first tapered section 202A, an intermediate section 204A, a second tapered section 205A, and a lower section 203A. On the other hand, the secondary coarse ore reduction furnace 30A includes an upper section 30A, a tapered section 302A and a lower section 303A.

In accordance with either embodiment of the present invention, the fluidized-bed-type reduction apparatus may include a melter gasifier 99 for melting finally-reduced coarse and medium/fine ores to produce ingot iron. In this instance, exhaust gas generated from the melter gasifier 99 may be used as a reducing gas for the secondary low-gas-velocity reduction furnace 40 and the secondary high-gas-velocity reduction furnace 30A as can be seen in FIG. 3.

The reason why the drying/preheating furnaces 10 and 10A, primary reduction furnaces 20 and 20A, and the secondary high-gas-velocity reduction furnace 30 have the tapered cylindrical structure is not only to actively fluidize iron ores including medium/fine ore portions at each lower furnace section, thereby improving the utilization degree of the reducing gas and the gas consumption rate, but also to decrease the gas velocity of the reducing gas in each upper furnace section, thereby suppressing the iron ores from being elutriated.

The iron ores to be treated in the drying/preheating furnaces 10 and 10A, and primary reduction furnaces 20 and 20A include a coarse ore portion as well as medium/fine ore portions. On the other hand, in the secondary high-gas-velocity reduction furnaces 30 and 30A, only the coarse iron ores should be reduced whereas in the secondary low-gas-velocity reduction furnace 40 only the medium/fine iron ores should be reduced. For this reason, the gas velocities used in these furnaces are different each other.

For the drying/preheating furnaces 10 and 10A, primary reduction furnaces 20 and 20A, and secondary low-gas-velocity reduction furnace 40, it is preferred that the gas velocity of the reducing gas in each associated lower furnace section should be kept equal to 1.5 to 3.0 times the minimum fluidizing velocity of the iron ores. The gas velocity of the reducing gas in each upper furnace section, however, should be kept lower than the terminal velocity of the iron ores being elutriated. For the secondary high-gas-velocity reduction furnaces 30 and 30A which are in a cylindrical shape involving a uniform gas velocity throughout its length, it is preferred that the gas velocity of the reducing gas be kept equal to 1.5 to 3.0 times the minimum fluidizing velocity in order to achieve a bubbling fluidization of coarse ores.

In order to provide an optimum gas velocity, the drying/preheating furnace 10 and primary reduction furnace 20 preferably have, at each associated lower section thereof, an inner diameter equal to 1.2 to 1.8 times the inner diameter of the secondary high-gas-velocity reduction furnace 30. If the inner diameter of each lower section of the furnaces 10 and is smaller than 1.2 times the inner diameter of the furnace 30, the gas velocity of the reducing gas in the furnaces 10 and becomes too high and it results in an excessively fast fluidization of fine iron ores. In this case, the reaction between the iron ores and the reducing gas hardly takes place. On the other hand, if the inner diameter of each lower section of the furnaces 10 and 20 is larger than 1.8 times the inner diameter of he furnace 30, the gas velocity of the reducing gas in the furnaces 10 and 20 becomes too low and it results in a defluidizing phenomenon.

It is also preferred that the drying/preheating furnace 10 and primary reduction furnace 20 have, at each associated lower section thereof, a height equal to 7.0 to 12.0 times the inner diameter of the same lower section. It is also preferred that the secondary high-gas-velocity reduction furnace 30 have a height equal to 20 to 30 times the inner diameter thereof.

Preferably, the drying/preheating furnace 10 and primary reduction furnace 20 also have, at each associated upper section thereof, an inner diameter equal to 3.5 to 5.0 times the inner diameter of the secondary high-gas-velocity reduction furnace 30. If the inner diameter of each upper section of the furnaces 10 and 20 is smaller than 3.5 times the inner diameter of the furnace 30, the gas velocity of the reducing gas in the furnaces 10 and 20 becomes too high and it results in an excessively fast fluidization of fine iron ores. On the other hand if the inner diameter of each upper sections of the furnaces 10 and 20 is larger than 5.0 times the inner diameter of the furnace 30, the gas velocity of the reducing gas in the furnaces 10 and 20 becomes too low and causes a defluidization phenomenon. The drying/preheating furnace 10 and primary reduction furnace 20 preferably have, at each associated upper section thereof, a height equal to 2.0 to 4.0 times the inner diameter of the same upper section.

Meanwhile, the secondary low-gas-velocity reduction furnace 40 preferably has, at the lower section thereof, an inner diameter equal to 2.0 to 3.0 times the inner diameter of the secondary high-gas-velocity reduction furnace 30. If the inner diamer of lower section of the furnace 40 is smaller than 2.0 times the inner diameter of the furnace 30, the gas velocity of the reducing gas in the furnace 40 becomes too high and it cause an excessively fast fluidization of fine iron ores. If the inner diameter of lower section of the furnace 40 is larger than 3.0 times the inner diameter of the furnace 30, the gas velocity of the reducing gas in the furnace 40 becomes too low and it causes a defluidization phenomenon.

Preferably, the secondary low-gas-velocity reduction furnace 40 also has, at the upper section thereof, an inner diameter equal to 2.8 to 4.0 times the inner diameter of the secondary high-gas-velocity reduction furnace 30. If the inner diameter of upper section of the furnace 40 is smaller than 2.8 times the inner diameter of the furnace 30, the gas velocity of the reducing gas in the furnace 40 becomes too high and it causes an excessively fast fluidization of fine iron ores. On the other hand, if the inner diameter of the upper section of the furnace 40 is larger than 4.0 times the inner diameter of the furnace 30, the gas velocity of the reducing gas in the furnace 40 becomes too low and it causes a defluidization phenomenon.

It is also preferred that the secondary low-gas-velocity reduction furnace 40 have, at the lower section thereof, a height equal to 7.0 to 12.0 times the inner diameter of the same lower section and, at the upper section thereof, a height equal to 2.0 to 4.0 times the inner diameter of the same upper section.

On the other hand, in the case of the fluidized-bed-type reduction apparatus shown in FIG. 3, the lower section 303A of the secondary high-gas-velocity reduction furnace 30A, which covers from the distributor 32 to a height corresponding to 5 to 15% of the entire height of the furnace 30A, is modified in reduced inner diameter equal to 0.5 to 0.9 times the inner diameter of the upper section 301A. The lower section 103A of the drying/preheating furnace 10A, which covers from the distributor 12 to a height corresponding to 5 to 15% of the entire height of the furnace 10A, is modified in reduced inner diameter equal to 0.5 to 0.9 times the inner diameter of the intermediate section 104A. The lower section 203A of the primary reduction furnace 20A, which covers from the distributor 22 to a height corresponding to 5 to 15% of the entire height of the furnace 20A, is also modified in reduced inner diameter equal to 0.5 to 0.9 times the inner diameter of the intermediate section 204A. With such structures, in the case of the drying/preheating furnace 10A and primary reduction furnace 20A, the gas velocity in each lower furnace section becomes higher than that in each associated intermediate furnace section by 1.3 to 4.0 times. In the case of the secondary high-gas-velocity reduction furnace 30A, the gas velocity in the lower furnace section becomes higher than that in the upper furnace section by 1.3 to 4.0 times with the above-mentioned modification. Accordingly, it becomes possible to make the fluidization of coarse iron ores distributed in the lower section of each furnace more active. As a result, sticking among the coarse iron ores due to their defluidization at a high temperature can be prevented. Furthermore, the maximum grain size of fluidizable iron ores can be increased, thereby widening the usable range of raw materials.

Preferably, the secondary high-gas-velocity reduction furnace 30A has, at the lower section thereof, a height equal to 2.0 to 3.0 times the inner diameter of the same lower section and, at the upper section thereof, a height equal to 15 to 20 times the inner diameter of the same upper section.

Based on theories and experiments, the inventors found out that the degradation of iron ores is almost completed at the early stage of the fluidizing reduction carried out at a high temperature and also that the gas consumption rate can be improved by carrying out the fluidizing reduction separately for two different grain size portions of iron ores, namely, coarse and medium/fine grain size portions. The inventors also discovered that the gas velocities required for the fluidization of fine iron ores are the same between the pre-reduction and the final reduction because the density of iron ores decreases as the reduction is carried out, while the density of the reducing gas increases. Taking these facts into consideration, the present invention proposes another fluidized bed type reduction apparatus which is illustrated in FIG. 4.

Figure 4:
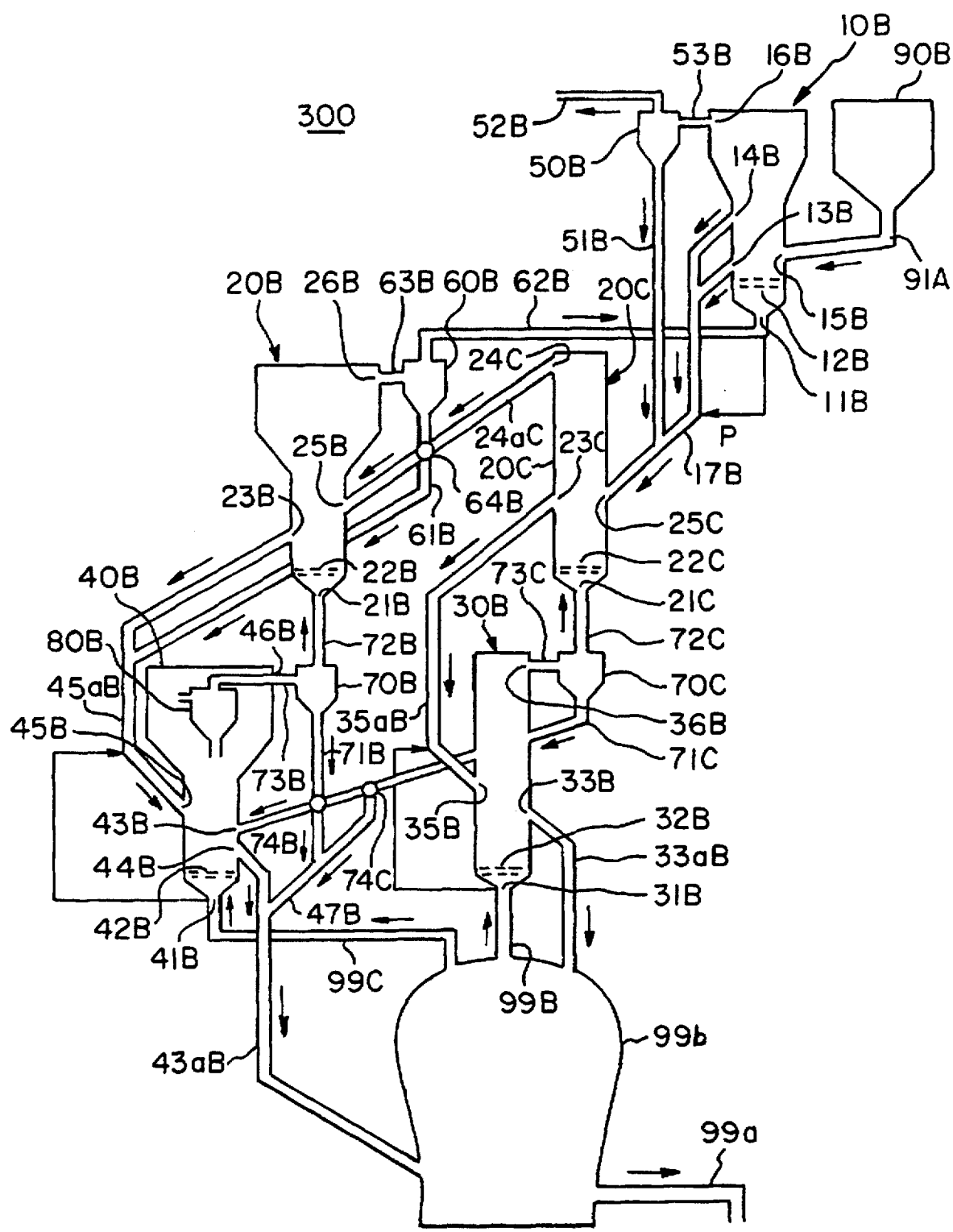
FIG. 4 is a schematic diagram illustrating a fluidized bed-type reduction apparatus for reducing fine iron ores of wide size distribution in accordance with another embodiment of the present invention.

As shown in FIG. 4, this apparatus, which is denoted by the reference numeral 300, includes a drying/preheating furnace 10B for drying and preheating iron ores supplied from a hopper 90B while forming a bubbling fluidized bed thereof. Downstream of the drying/preheating furnace 10B, a primary high-gas-velocity reduction furnace 20C is arranged to elutriate a medium/fine ore portion of the dried/preheated iron ores by the exhaust gas in the furnace 20C, thereby separating them from a coarse ore portion of the iron ores. The primary high-gas-velocity reduction furnace 20C primarily reduces only the coarse ore portion of the dried/preheated iron ores remained in the furnace 20C while forming a bubbling fluidized bed thereof. The apparatus also includes a primary low-gas-velocity reduction furnace 20B for primarily reducing the elutriated medium/fine iron ores from the furnace 20C while forming a bubbling fluidized bed thereof, a secondary high-gas-velocity reduction furnace 30B for finally reducing the primarily reduced coarse iron ores while forming a bubbling fluidized bed thereof, and a secondary low-gas-velocity reduction furnace 40B for finally reducing the primarily reduced medium/fine iron ores while forming a bubbling fluidized bed thereof.

The drying/preheating furnace 10B is provided at the bottom portion thereof with a first gas inlet 11B for receiving exhaust gas from a second cyclone 60B. A first gas distributor 12B is installed at the lower section of the drying/preheating furnace 10B. The drying/preheating furnace 10B is also provided at one side thereof with a first ore inlet 15B for receiving iron ores from the hopper 90B, and at the other side thereof with a first coarse ore outlet 13B and a first medium/fine ore outlet 14B. These ore outlets 13B and 14B are connected to the primary high-gas-velocity reduction furnace 20C via a first duct line 17B so that iron ores can be fed therethrough. A first exhaust gas outlet 16B is provided at the side of the upper section 101 opposite to the first ore inlet 15B to discharge exhaust gas from the drying/preheating furnace 10B. This first exhaust gas outlet 16B is connected to a first cyclone 50B via a first exhaust gas line 53B. The first cyclone 50B is adapted to capture dusty iron ores contained in the exhaust gas from the drying/preheating furnace 10B. The first cyclone 50B is connected at its bottom portion to a first dusty ore discharge line 51B and at its top portion to a first cleaned exhaust gas line 52B. The first dusty ore discharge line 51B is connected at one end thereof to the first duct line 17B so that iron ores can be fed therethrough.

The primary low-gas-velocity reduction furnace 20B is provided at the bottom portion thereof with a second gas inlet 21B for receiving exhaust gas from a third cyclone 70B. A second gas distributor 22B is installed at the lower section of the primary low-gas-velocity reduction furnace 20B. The primary low-gas-velocity reduction furnace 20B is also provided at one side of its lower section with a second medium/fine ore outlet 24B and at the other side of the lower section with a second medium/fine ore inlet 25B. The primary low-gas-velocity reduction furnace 20B also has a second exhaust gas outlet 26B at the side of its upper section opposite to the second medium/fine ore outlet 24B in order to discharge exhaust gas from the primary low-gas-velocity reduction furnace 20B. The second cyclone 60B serves to capture dusty iron ores contained in the exhaust gas from the primary low-gas-velocity reduction furnace 20B. The second cyclone 60B is connected at its bottom portion to a second dusty ore discharge line 61B and at its top portion to a second cleaned exhaust gas line 62B. The second exhaust gas outlet 26B is connected to the second cyclone 60B via a second exhaust gas line 63B so that gas can be red therethrough.

The primary high-gas-velocity reduction furnace 20C is provided at the bottom portion thereof with a third gas inlet 21C for receiving exhaust gas from a fourth cyclone 70C. A third gas distributor 22C is installed at the lower section of the primary high-gas-velocity reduction furnace 20C. The primary high-gas-velocity reduction furnace 20C is also provided at one side of its lower section with a second coarse ore outlet 23C and at one side of the under section with a third medium/fine ore outlet 24C. This outlet 24C can also be an exhaust gas outlet from the furnace 20C. The primary high-gas-velocity reduction furnace 20C also has a third ore inlet 25C at the other side of its lower-section.

The third medium/fine ore outlet 24C is connected to the second ore inlet 25B of the primary low-gas-velocity reduction furnace 20B via a first medium/fine ore discharge line 24aC so that ores are fed therethrough. The second dusty ore discharge line 61B intersects with the first medium/fine ore discharge line 24aC. Preferably, a bi-directional discharge valve 64B is installed at the intersection between lines 24aC and 61B so that the dusty iron ores captured in the second cyclone 60B can be recirculated to the primary low-gas-velocity reduction furnace 20B or directly re-circulated to the lower section of the secondary low-gas-velocity reduction furnace 40B.

The secondary high-gas-velocity reduction furnace 30B is provided at the bottom portion thereof with a fourth gas inlet 31B for receiving exhaust gas from a melter gasifier 99 via a fifth exhaust gas line 99b. A fourth gas distributor 32B is installed at the lower section of the secondary high-gas-velocity reduction furnace 30B. The secondary high-gas-velocity reduction furnace 30B is also provided at one side of its lower section with a fourth ore inlet 35B and at the other side of the lower section with a third coarse ore outlet 33B. The secondary high-gas-velocity reduction furnace 30B also has a third exhaust gas outlet 36B at the side of its upper section opposite to the fourth ore inlet 35B in order to discharge exhaust gas from the secondary high-gas-velocity reduction furnace 30B.

The fourth cyclone 70C serves to capture dusty iron ores contained in the exhaust gas from the secondary high-gas-velocity reduction furnace 30B. The fourth cyclone 70C is connected at its bottom portion to a fourth dusty ore discharge line 71C and at its top portion to a fourth cleaned exhaust gas line 72C being connected at one end thereof with the third gas inlet 21C. The third exhaust gas outlet 36B is connected to the fourth cyclone 70C via a fourth exhaust gas discharge line 73C so that gas is fed upstream therethrough.

The secondary high-gas-velocity reduction furnace 30B is connected to the primary high-gas-velocity reduction furnace 20C via a first coarse ore discharge line 35aB and to the melter gasifier 99 via a second coarse ore discharge line 33aB so that ores can be fed downstream therethrough.

The secondary low-gas-velocity reduction furnace 40B is provided at the bottom portion thereof with a fifth gas inlet 41B for receiving exhaust gas from the melter gasifier 99 via a sixth exhaust gas discharge line 99C. A fifth gas distributor 42B is installed at the lower section of the secondary low-gas-velocity reduction furnace 40B.

The secondary low-gas-velocity reduction furnace 40B is also provided at one side of its lower section with a fifth ore inlet 43B and a third medium/fine ore outlet 44B. At the other side of the lower section, a sixth ore inlet 45B is provided. The secondary low-gas-velocity reduction furnace 40B also has at one side of its upper section a fourth exhaust gas outlet 46B.

Preferably, an inner cyclone 80B is installed in the secondary low-gas-velocity reduction furnace 40B. The inner cyclone 80B separates dusty ores, which are elutriated by the merged reducing gas in the secondary low-gas-velocity reduction furnace 40B, from exhaust gas generated from the secondary low-gas-velocity reduction furnace 40B. The inner cyclone 80B re-circulates the separated dusty iron ores to the lower section of the secondary low-gas-velocity reduction furnace 40B while discharging the cleaned exhaust gas to a third cyclone 70B via a third exhaust gas line 73B. The sixth ore inlet 45B is connected to the second medium/fine ore outlet 24B via a second medium/fine ore discharge line 45aB. The second dusty ore discharge line 61B is connected at one end thereof to the second medium/fine ore discharge line 45aB.

The third medium/fine ore outlet 44B is connected to the lower portion of the melter gasifier 99 via a third medium/fine ore discharge line 43aB. The fifth ore inlet 43B is connected to the fourth cyclone 70C via the fourth dusty ore discharge line 71C.

The third medium/fine ore discharge line 43aB is connected to the fourth dusty ore discharge line 71C via a second duct line 47B.

The third cyclone 70B is connected at its bottom portion to a third dusty ore discharge line 71B and at its top portion to a third cleaned exhaust gas line 72B being connected at one end thereof with the second circulation line 47B. When the secondary medium/fine ore reduction furnace 40B does not include the inner cyclone 80B, the third cyclone 70B is directly connected to the secondary low-gas-velocity reduction furnace 40B via the third exhaust gas discharge line 73B. The third dusty ore discharge line 71B intersects with the fourth dusty ore discharge line 71C. Preferably, a bi-directional discharge valve 74B is installed at the intersection between lines 71B and 71C. At the connection between the fourth dusty ore discharge line 71c and second circulation line 47B, another bi-directional discharge valve 74C is preferably provided.

Preferably, purging gas lines P are connected to each bended portion of the first circulation line 17B, first coarse ore discharge line 35aB and second medium/fine ore discharge line 45aB so as to supply a small amount of purging gas to those lines, thereby preventing the lines from being plugged by iron ores being fed through the lines.

The drying/preheating furnace 10B, primary low-gas-velocity reduction furnace 20B and secondary low-gas-velocity reduction furnace 40B all have a enlarged-upper-reduced-lower cylindrical furnace body in which the diameter of their lower portions is smaller than those of their upper portions. That is, each body of these furnaces includes an enlarged upper cylindrical section, an intermediate tapered section increasing in diameter from its lower end to its upper end, and a reduced lower cylindrical section. On the other hand, the primary and secondary high-gas-velocity reduction furnaces 20C and 30B have a cylindrical furnace body having a uniform diameter throughout its length. It is preferred that the drying/preheating furnace 10B, primary low-gas-velocity reduction furnace 20B and secondary low-gas-velocity reduction furnace 40B have, at each associated lower section thereof, a height equal to 7.0 to 12.0 times the inner diameter of the same lower section. It is also preferred that the primary and secondary high-gas-velocity reduction furnaces 20C and 30B have a height equal to 20 to times the inner diameter thereof.

In FIG. 4, the reference numeral 99a denotes a molten iron outlet.

Now, a method for producing reduced iron or molten pig iron using the fluidized bed type reduction apparatus having the arrangement shown in FIG. 2 in accordance with the present invention will be described.

As shown in FIG. 2, fine iron ores contained in the hopper 90 are supplied to the drying/preheating furnace 10 through the ore supply line 91 and first ore inlet 15. The drying/preheating furnace 10 is also supplied with exhaust gas from the primary reduction furnace 20 through the second cyclone 60, the second cleaned exhaust gas line 62 and first gas inlet 11. This exhaust gas is uniformly distributed in the drying/preheating furnace 10 by means of the first gas distributor 12. By the uniformly distributed gas, the iron ores are dried and preheated at a bubbling fluidized state. The dried/preheated iron ores are then fed to the primary reduction furnace 20 via the coarse ore outlet 13, medium/fine ore outlet 14, first duct line 17 and second ore inlet 25.

The exhaust gas is discharged outward from the drying/preheating furnace 10, in which iron ores are dried and preheated by the exhaust gas before being exhausted via the first exhaust gas outlet 16, first exhaust gas line 53, first cyclone 50 and first cleaned gas discharge line 52 in order. Dusty iron ores contained in the exhaust gas are captured in the first cyclone 50 and then recirculate to the primary reduction furnace 20 via the first dusty ore discharge line 51 and second ore inlet 25.

The dried/preheated iron ores supplied in the primary reduction furnace 20 are then pre-reduced at a bubbling fluidized state by the exhaust gas which is fed to the primary reduction furnace 20 via the third cyclone 70, third cleaned exhaust gas line 72, second gas inlet 21 and second gas distributor 22. The pre-reduced iron ores are discharged through either the coarse ore outlet 23 or medium/fine ore outlet 24, and then fed to the secondary high-gas-velocity reduction furnace 30 via the second duct line 27 and third ore inlet 35.

In the primary reduction furnace 20, exhaust gas is also generated while iron ores are primarily reduced. This exhaust gas is discharged from the primary reduction furnace 20 via the second exhaust gas outlet 26, second exhaust gas line 63, second cyclone 60 and second cleaned exhaust gas line 22 in order and then introduced in the drying/preheating furnace 10. Dusty iron ores contained in the exhaust gas are captured in the second cyclone 60 and then recirculated to the secondary high-gas-velocity reduction furnace 30 via the second dusty ore discharge line 61, second circulation line 27 and third ore inlet 35.

The secondary high-gas-velocity reduction furnace 30 finally reduces a coarse ore portion of the iron ores received therein at a bubbling fluidized state by a reducing gas supplied in the furnace 30 via the first reducing gas supply line 31a, third gas inlet 31 and third gas distributor 32. At this time, a medium/fine ore portion of the iron ores is elutriated by exhaust gas generated in the secondary high-gas-velocity reduction furnace 30. The gas velocity of the reducing gas supplied in the secondary coarse ore reduction furnace 30 should always be higher than the terminal velocity of medium/fine ore.

The medium/fine iron ores elutriated by the exhaust gas are then carried over to the secondary low-gas-velocity reduction furnace 40 via the third medium/fine ore outlet 34, third medium/fine ore discharge line 34a and fourth ore inlet 45. On the other hand, the finally reduced coarse iron ores are fed to a reduced iron storing vessel or to the melter gasifier 99 (as in the case of FIG. 3) via the second coarse ore outlet 33 and third coarse ore discharge line 33a.

Meanwhile, the medium/fine iron ores supplied in the secondary low-gas-velocity reduction furnace 40 are finally reduced at a bubbling fluidized state by a reducing gas supplied in the furnace 40 via the second reducing gas supply line 41a, fourth gas inlet 41 and fourth gas distributor 42. The finally reduced medium/fine iron ores are fed to the reduced iron storing vessel or to the melter gasifier 99 (as in the case of FIG. 3) via the second medium/fine ore outlet 44 and third medium/fine ore discharge line 44a. The flow rate of the reducing gas supplied in the secondary medium/fine ore reduction furnace 40 should always be higher than the mean minimum fluidizing velocity of medium/fine ore.

Exhaust gas generated during finally reducing medium/fine iron ores in the secondary low-gas-velocity reduction furnace 40 is introduced in the primary reduction furnace 20 after being discharged through the inner cyclone 80, third exhaust gas outlet 73, third cyclone 70, and third clean gas discharge line 72 in order. Dusty iron ores contained in the exhaust gas are separated from the exhaust gas in the inner cyclone 80 and then recirculated to the third duct line 44a via the third dusty ore discharge line 71.

When the reduced iron ores are charged into the melter gasifier 99, they are melted, thereby producing molten pig iron. On the other hand, the reduced iron stored in the reduced iron storing vessel will be subsequently transported to a next stage for various purpose.

On the other hand, it is preferred that the gas velocity of gas in each lower section of the drying/preheating furnaces 10 and 10A, primary reduction furnaces 20 and 20A, and secondary low-gas-velocity reduction furnace 40 is kept at a value equal to 1.5 to 3.0 times the minimum fluidizing velocity of the iron ores residing in each associated fluidized bed. For these furnaces, it is also preferred that the gas velocity of gas in each upper section be kept lower than the terminal velocity of the iron ores being elutriated. For the secondary high-gas-velocity reduction furnaces 30 and 30A, the gas velocity of gas preferably is kept at a value equal to 1.5 to 3.0 times the minimum fluidizing velocity of coarse iron ore. It is also preferred that the pressure and temperature of gas supplied to each of the secondary low-gas-velocity reduction furnace 40 and secondary high-gas-velocity reduction furnaces 30 and 30A range from 2 to 4 atm. and 800° to 900° C., respectively. For the drying/preheating furnaces 10 and 10A, primary reduction furnaces 20 and 20A, and secondary low-gas-velocity reduction furnace 40, the pressure drop occurring in each furnace preferably ranges from 0.3 to 0.6 atm. and the temperature drop occurring in each furnace preferably ranges from 30 to 80° C. Preferably, the residence time of iron ores in each furnace is 20 to 40 minutes.

Another method for producing reduced iron or molten pig iron using the fluidized bed type reduction apparatus having the arrangement shown in FIG. 4 in accordance with the present invention will now be described.

As shown in FIG. 4, fine iron ores contained in the hopper 90B are supplied to the drying/preheating furnace 10B and then dried and preheated in the drying/preheating furnace 10B by exhaust gas supplied from the second cyclone 60B. The dried/preheated iron ores are then fed to the lower portion of the primary high-gas-velocity reduction furnace 20C which receives exhaust gas from the fourth cyclone 70C as a reducing gas. The gas velocity of the reducing gas the primary high-gas-velocity reduction furnace 20C is controlled to be higher than the terminal velocity of medium/fine ore, thereby elutriating a medium/fine ore portion of the iron ores by the exhaust gas. As a result, this medium/fine ore portion is separated from the coarse ore portion of the iron ores. The coarse ores remained in the primary coarse ore reduction furnace 20C are primarily reduced while forming a bubbling fluidized bed. The coarse ores are then fed to the secondary high-gas-velocity reduction furnace 30B through the second coarse ore outlet 23C. On the other hand, the medium/fine ores elutriated by the exhaust gas in the primary high-gas-velocity reduction furnace 20C are transported to the lower section of the primary medium/fine ore reduction furnace 20B via the first medium/fine ore discharge line 24aC. In the primary low-gas-velocity reduction furnace 20B, the medium/fine ores are primarily reduced at a bubbling fluidized state by exhaust gas supplied from the third cyclone 70B in a value of higher than the mean minimum fluidizing velocity of medium/fine ore. After being reduced, the medium/fine ores are fed to the secondary low-gas-velocity reduction furnace 40B.

In the primary low-gas-velocity reduction furnace 20B, dusty ores are elutriated by the reducing gas supplied in the primary low-gas-velocity reduction furnace 20B via either the first medium/fine ore discharge line 24aC or second gas ore inlet 21B. These dusty ores are then fed along with exhaust gas from in the primary low-gas-velocity reduction furnace 20B to the second cyclone 60B, in which the dusty ores are captured. By the bi-directional discharge valve 64B, the captured dusty ores are re-circulated to the primary low-gas-velocity reduction furnace 20B or secondary low-gas-velocity reduction furnace 40B so that they will be primarily or finally reduced. The reduced medium/fine and dusty ores are discharged through the second medium/fine ore outlet 24B and second dusty ore discharge line 61B, respectively. The coarse ores supplied in the secondary high-gas-velocity reduction furnace 30B are finally reduced while forming a bubbling fluidized bed in the furnace 30B by exhaust gas supplied from the melter gasifier 99. After being reduced, the coarse ores are charged into the melter gasifier 99 via the third coarse ore outlet 33B and second coarse ore discharge line 33aB. The melter gasifier 99 melts the received ores, thereby producing pig iron.

The gas velocity of the reducing gas supplied in the secondary high-gas-velocity reduction furnace 30B is equal to that in the primary high-gas-velocity reduction furnace 20C. Dusty iron ores elutriated from the secondary high-gas-velocity reduction furnace 30B are captured in the fourth cyclone 70C and then circulated to the secondary low-gas-velocity reduction furnace 40B or directly charged into the melter gasifier 99 by the use of the bi-directional discharge valve 74C. The medium/fine ores supplied in the secondary low-gas-velocity reduction furnace 40B are finally reduced at a bubbling fluidized bed in the furnace 40B by exhaust gas supplied from the melter gasifier 99. The gas velocity of the reducing gas supplied in the secondary low-gas-velocity reduction furnace 40B is equal to that in the primary low-gas-velocity ore reduction furnace 20B. Dusty iron ores elutriated in the secondary low-gas-velocity reduction furnace 40B are captured by the inner cyclone 80B and third cyclone 70B and then recirculated to the secondary low-gas-velocity reduction furnace 40B so that they can be finally reduced. The dusty iron ores captured in the third cyclone 70B may also be directly charged to the melter gasifier 99 by the use of the bi-directional discharge valve 74B. The finally reduced medium/fine and dusty ores are discharged through the third medium/fine ore outlet 44B and third dusty ore discharge line 71B, respectively. The ores are then charged into the melter gasifier 99 via the third medium/fine ore outlet 43aB. The melter gasifier 99 melts the received ores, thereby producing pig iron.

In accordance with this embodiment, two twin type fluidized furnaces (the primary low-gas-velocity reduction furnace 20B, primary high-gas-velocity reduction furnace 20C, secondary low-gas-velocity reduction furnace 40B, and secondary high-gas-velocity reduction furnace 30B) are employed in order to reduce the gas consumption rate as much as possible. At the pre-reduction step, iron ores are separated into a coarse ore portion and a medium/fine portion so that these portions can be individually pre-reduced at a fluidized state. At the final reduction step, the ore portions are also individually subjected to a final reduction. The apparatus of this embodiment utilizes the advantage of the conventional twin type fluidized beds 20B and 20C in which the upper portion is connected to the lower portion via a duct line 24aC. Accordingly, iron ores can be appropriately separated into a coarse ore portion and a medium/fine ore portion from the pre-reduction stage. Since the degradation of iron ores is almost completed at the preheating and-pre-reduction step, the separated coarse and medium/fine ores are pre-reduced and finally reduced independently. In the final reduction stage, however, a twin fluidized beds but without a connection between the low-gas-velocity and high-gas-velocity reduction furnaces is employed. With such a structure, the present invention solves the problem involved in the conventional twin type structure caused by the mixing of gases. Since the primary and secondary high-gas-velocity reduction furnaces 20C and 30B, or the primary and secondary low-gas-velocity reduction furnaces 20B and 40B are the same in shape and dimension, they can be connected in a gas stream. In this case, the fluidization operations of these two reactors can be simultaneously controlled in a gas velocity. Accordingly, it is possible to simplify the entire operation of the apparatus. In accordance with the present invention, the single type drying/preheating furnace 10B, twin type primary low-gas-velocity reduction furnace 20B and twin type secondary low-gas-velocity reduction furnace 40B have a enlarged-upper-reduced-lower cylindrical body in which the diameter of their lower portions is smaller than those of their upper portions so as not only to obtain an active bubbling fluidization of iron ores in each reduced lower section thereof, thereby increasing the gas utilization degree, but also to decrease the gas velocity of gas in its enlarged upper section thereof, thereby suppressing an elutriation of dusty ores while reducing the gas consumption rate. For these furnaces, the gas velocity of the reducing gas in each lower section should be equal to 1.5 to 3.0 times the minimum fluidizing velocity of the iron ores to be charged in a fluidized bed of each associated furnace. The gas velocity of the reducing gas in each upper section, however, should be lower than the terminal velocity of the iron ores being elutriated. For the primary and secondary high-gas-velocity reduction furnaces 20C and 30B each having a uniform cylindrical structure involving a uniform gas velocity throughout its length, the gas velocity of the reducing gas should be equal to 1.5 to 3.0 times the minimum fluidizing velocity of coarse iron ore.

It is also preferred that the pressure and temperature of gas supplied to each of the secondary high-gas-velocity reduction furnace 30B and secondary low-gas-velocity reduction furnace 40B range from 2 to 4 atm. and 800° to 900° C., respectively. For the drying/preheating furnace 10B, primary and secondary low-gas-velocity reduction furnaces 20B and 40B, and primary and secondary high-gas-velocity reduction furnaces 20C and 30B, the pressure drop occurring in each furnace preferably ranges from 0.3 to 0.6 atm. and the temperature drop occurring in each furnace preferably ranges from 30° to 80° C. Preferably, the residence time of iron ores in each furnace is 20 to 40 minutes.

The present invention will be understood more readily with reference to the following examples; however these examples are only intended to illustrate the invention and are not to be construed to limit the scope of the present invention.

EXAMPLE 1

A fluidized-bed-type reduction apparatus having the construction as shown in FIG. 2 was constucted. This fluidized-bed-type reduction apparatus had the following dimensions:
1) Inner Diameter and Height of Each Fluidized-Bed-Type Furnace
  Drying/Preheating Furnace
   Inner Diameter of Lower Section: 0.3 m;
   Height of Lower Section: 4.0 m;
   Inner Diameter of Upper Section: 0.90 m;
   Height of Upper Section: 2.50 m;
  Primary Reduction Furnace
   Inner Diameter of Lower Section: 0.3 m;
   Height of Lower Section: 4.0 m;
   Inner Diameter of Upper Section: 0.90 m;
   Height of Upper Section: 2.50 m;
  Secondary High-Gas-Velocity Reduction Furnace
   Inner Diameter: 0.2 m;
   Height: 5.20 m;
  Secondary Low-Gas-Velocity Reduction Furnace
   Inner Diameter of Lower Section: 0.50 m;
   Height of Lower Section: 2.70 m;
   Inner Diameter of Upper Section: 0.90 m;
   Height of Upper Section: 2.30 m.

Using the fluidized-bed-type reduction apparatus as mentioned above, the production of reduced iron and molten pig iron was carried out under the following conditions:
2) Charge and Discharge of Iron Ores
  Composition of Fine Iron Ores
   T.Fe: 62.36%, $SiO_2$: 5.65%, $Al_2O_3$: 2.91%, S: 0.007%, and P: 0.065%;
  Particle Size Distribution
   <0.25 mm=22%, 0.25 mm–1.0 mm=28%, and 1.0 mm–5.0 mm=50%;
  Feed Rate: 6 Kg/min
  Discharge Rate from Third Coarse Ore Outlet: 3.0 Kg/min
  Discharge Rate from Third Medium/Fine Ore Outlet: 1.2 Kg/min
  Discharge Rate from Third Dusty Ore Outlet: 3.0 Kg/min;
3) Reducing Gas
  Composition: CO: 65%, $H_2$: 25%, and $CO_2+H_2O$: 10%;
  Temperature: about 850°C.; and
  Pressure: 2.3 $Kgf/cm^2$
4) Superficial Gas Velocity in Each Furnace
  Drying/Preheating Furnace
   Superficial Gas Velocity in Lower Section: 2.22 m/s;
   Superficial Gas Velocity in Upper Section: 0.25 m/s;
  Primary Reduction Furnace
   Superficial Gas Velocity in Lower Section: 2.22 m/s;
   Superficial Gas Velocity in Upper Section 0.25 m/s;
  Secondary High-Gas-Velocity Reduction Furnace: 3.0 m/s;
  Secondary Low-Gas-Velocity Reduction Furnace
   Superficial Gas Velocity in Lower Section: 0.32 m/s;
   Superficial Gas Velocity in Upper Section: 0.25 m/s;

Under the above conditions, it was possible to maintain the iron ores at a bubbling fluidized state in each of the drying/preheating furnace 10, primary reduction furnace 20, secondary high-gas-velocity reduction furnace 30 and secondary low-gas-velocity reduction furnace 40. The mean gas utilization degree was about 29%, and the gas consumption rate was about 1,290 $Nm^3$/t-ore.

Mean reduction degree of iron ores respectively discharged through the third coarse ore outlet 33 of the secondary high-gas-velocity reduction furnace 30A, the third medium/fine ore outlet 43 of the secondary low-gas-velocity reduction furnace and the third dusty ore discharge line 71 were 87%, 89% and 84%. After 60 minutes elapsed from the beginning of the reduction, reduced iron was discharged.

The reduced iron discharged from the third coarse ore outlet 33 of the secondary high-gas-velocity reduction furnace 30 has a grain size distribution consisting of <0.2 mm: 8%, 0.2 mm–0.5 mm: 11%, 0.5 mm–1.0 mm: 14%, 1.0 mm–3.0 mm: 57% and 3.0 mm–5.0 mm: 10%. On the other hand, the reduce iron discharged from the third medium/fine ore outlet 43 of the secondary low-gas-velocity reduction furnace 40 has a grain size distribution consisting of <0.05 mm: 1.0%, 0.05 mm–0.1 mm: 17%, 0.1 mm–0.2 mm: 72%, and 0.2 mm–0.5 mm: 10%.

The amount and grain size of the reduced iron discharged from each outlet could be controlled by the gas velocity of the reducing gas being supplied. A variation in reduction degree could also be found when the residence time of iron ores in each furnace was changed.

EXAMPLE 2

A fluidized-bed-type reduction apparatus having the construction as shown in FIG. 3 was prepared. This fluidized-bed-type reduction apparatus had the following dimension:

1) Inner Diameter and Height of Each Fluidized-Bed-Type Furnace
   Drying/Preheating Furnace
   Inner Diameter of Lower Section near Distributor: 0.22 m;
   Height of Lower Section near Distributor: 0.70 m;
   Inner Diameter of Intermediate Section: 0.30 m;
   Height of Intermediate Section: 3.50 m,
   Inner Diameter of Upper Section: 0.90 m;
   Height of Upper Section: 2.50 m;
   Primary Reduction Furnace
   Inner Diameter of Lower Section near Distributor: 0.22 m;
   Height of Lower Section near Distributor: 0.70 mn;
   Inner Diameter of Intermediate Section: 0.30 m;
   Height of Intermediate Section: 3.50 m;
   Inner Diameter of Upper Section: 0.90 m;
   Height of Upper Section: 2.50 m;
   Secondary High-Gas-Velocity Reduction Furnace
   Inner Diameter of Lower Section near Distributor: 0.26 m;
   Height of Lower Section near Distributor: 0.50 m;
   Inner Diameter of Upper Section: 0.30 m;
   Height of Upper Section: 4.70 m;
   Secondary Low-Gas-Velocity Reduction Furnace
   Inner Diameter of Lower Section: 0.50 m;
   Height of Lower Section: 2.70 m;
   Inner Diameter of Upper Section: 0.90 m;
   Height of Upper Section: 2.30 m.

Using the fluidized-bed-type reduction apparatus as mentioned above, the production of reduced iron and molten pig iron was carried out under the following conditions:

2) Charge and Discharge of Iron Ores
   Composition of Fine Iron Ores
   T.Fe: 62.36%, $SiO_2$: 5.65%, $Al_2O_3$: 2.91%, S: 0.007%, and P: 0.065%;
   Particle Size Distribution
   <0.25 mm=20%, 0.25 mm–1.0 mm=23%, 1.0 mm–5.0 mm=45%, and 5.0 mm–8.0 mm=12%;
   Feed Rate: 6 Kg/min
   Discharge Rate from Third Coarse Ore Outlet: 3.0 Kg/min
   Discharge Rate from Third Medium/Fine Ore Outlet: 1.2 Kg/min
   Discharge Rate from Third Dusty Ore Outlet: 0.06 Kg/min 3) Reducing Gas
   Composition: CO: 65%, $H_2$: 25%, and $CO_2+H_2O$: 10%;
   Temperature: about 850° C.; and
   Pressure: 2.3 $Kgf/cm^2$ 4) Superficial Gas Velocity in Each Furnace
   Drying/Preheating Furnace
   Superficial Gas Velocity in Lower Section near Distributor: 4.12 m/s;
   Superficial Gas Velocity in Intermediate Section: 2.22 m/s;
   Superficial Gas Velocity in Upper Section: 0.25 m/s;
   Primary Reduction Furnace
   Superficial Gas Velocity in Lower Section near Distributor: 4.12 m/s;
   Superficial Gas Velocity in Intermediate Section: 2.22 m/s;
   Superficial Gas Velocity in Upper Section: 0.25 m/s;
   Secondary High-Gas-Velocity Reduction Furnace
   Superficial Gas Velocity in Lower Section near Distributor: 4.0 m/s;
   Superficial Gas Velocity in Upper Section: 3.0 m/s;
   Secondary Low-Gas-Velocity Reduction Furnace
   Superficial Gas Velocity in Lower Section: 0.32 m/s;
   Superficial Gas Velocity in Upper Section: 0.25 m/s;

A fluidizing reduction was carried out for iron ores of wide size distribution, namely, iron ores having a grain size of less than 8 mm while obtaining an active bubbling fluidization of coarse iron ores (otherwise it would be mainly distributed- in the lower section of each furnace) under the above-mentioned conditions. In this example, a mean reduction degree of 89% was obtained at the same gas consumption rate and gas utilization degree as those in Example 1 related to the fluidizing reduction for iron ores having a grain size of less than 5 mm.

EXAMPLE 3

0.4 Kg of iron ores having a grain sizes ranging from 1 mm to 5 mm were reduced by a reducing gas in a laboratory-scale fluidized-bed-type reduction furnace at a temperature of about 850° C. The superficial gas velocity of the reducing gas was about 4 m/s. The reducing gas had a composition of CO: 65%, $CO_2$: 0.5%, $H_2$: 25% and Ar: 5%. The degradation of the iron ores was checked. The result is shown in FIG. 5.

Respective terminal velocities at 1, 2, 3 and 4 atm. were calculated for the case of fluidizing iron ores at 850° C. using a reducing gas which had a composition of CO: 46%, $CO_2$: 15%, $H_2$: 20%, $H_2O$: 8% and $N_2$: 11% in the primary reduction and a composition of CO: 59%, $CO_2$: 3%, $H_2$: 25%, $H_2O$: 2% and $N_2$: 11% in the final reduction. The results are shown in FIG. 6.

Figure 7:
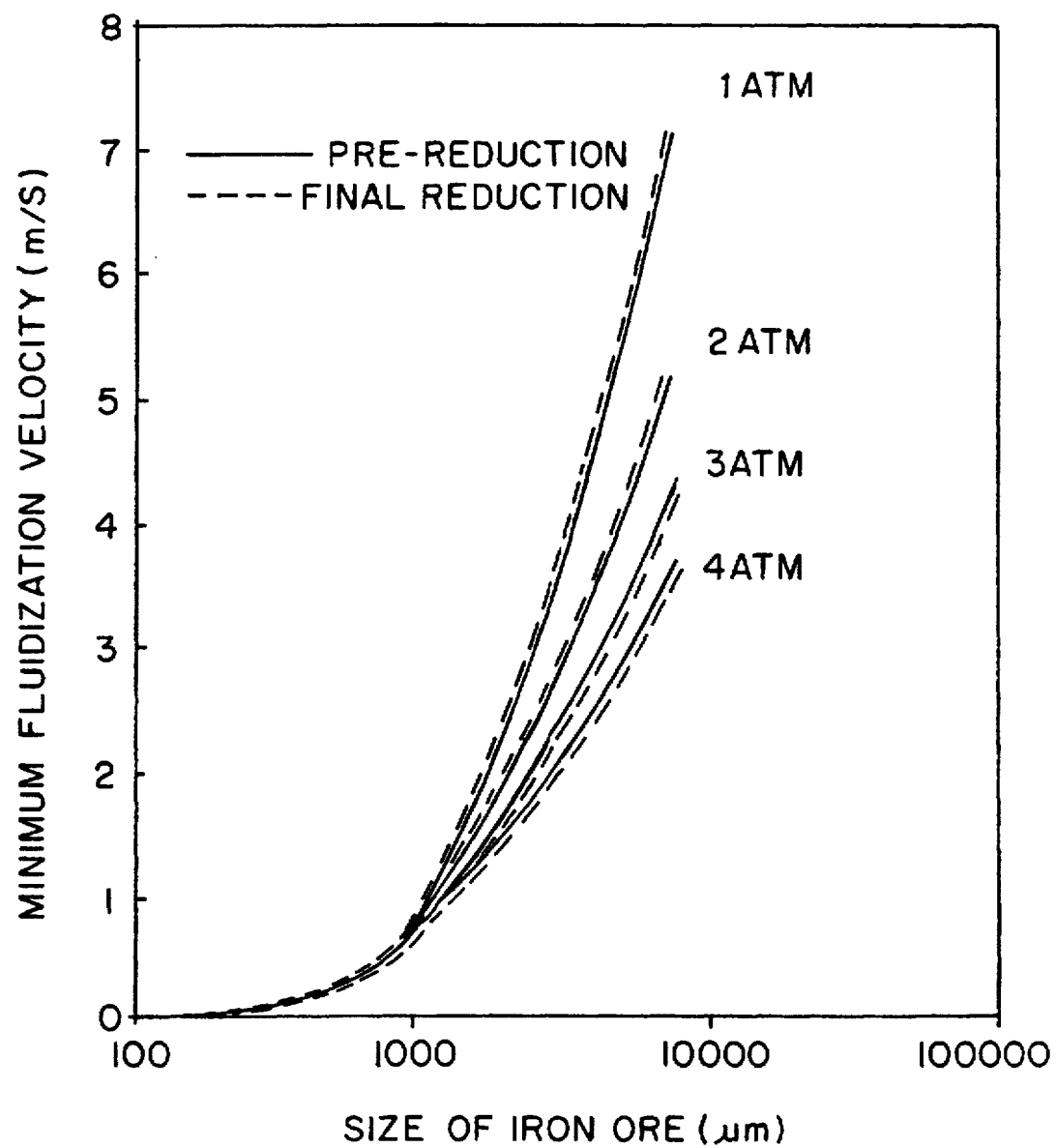
FIG. 7 is a graph illustrating variations in minimum fluidizing velocity with the pressure of the reducing gas, respectively represented for the pre-reduction and final reduction at different grain sizes.

Respective minimum fluidizing velocities at 1, 2, 3 and 4 atm. to obtain individual fluidizations for different grain sizes were calculated by the Wen and Yu formula for the case of fluidizing iron ores at 850° C. using a reducing gas which had a composition of CO: 46%, $CO_2$: 15%, $H_2$: 20%, $H_2O$: 8% and $N_2$: 11% in the primary reduction and a composition of CO: 59%, $CO_2$: 3%, $H_2$: 25%, $H_2O$: 2% and $N_2$: 11% in the final reduction. The results are shown in FIG. 7.

Figure 5:
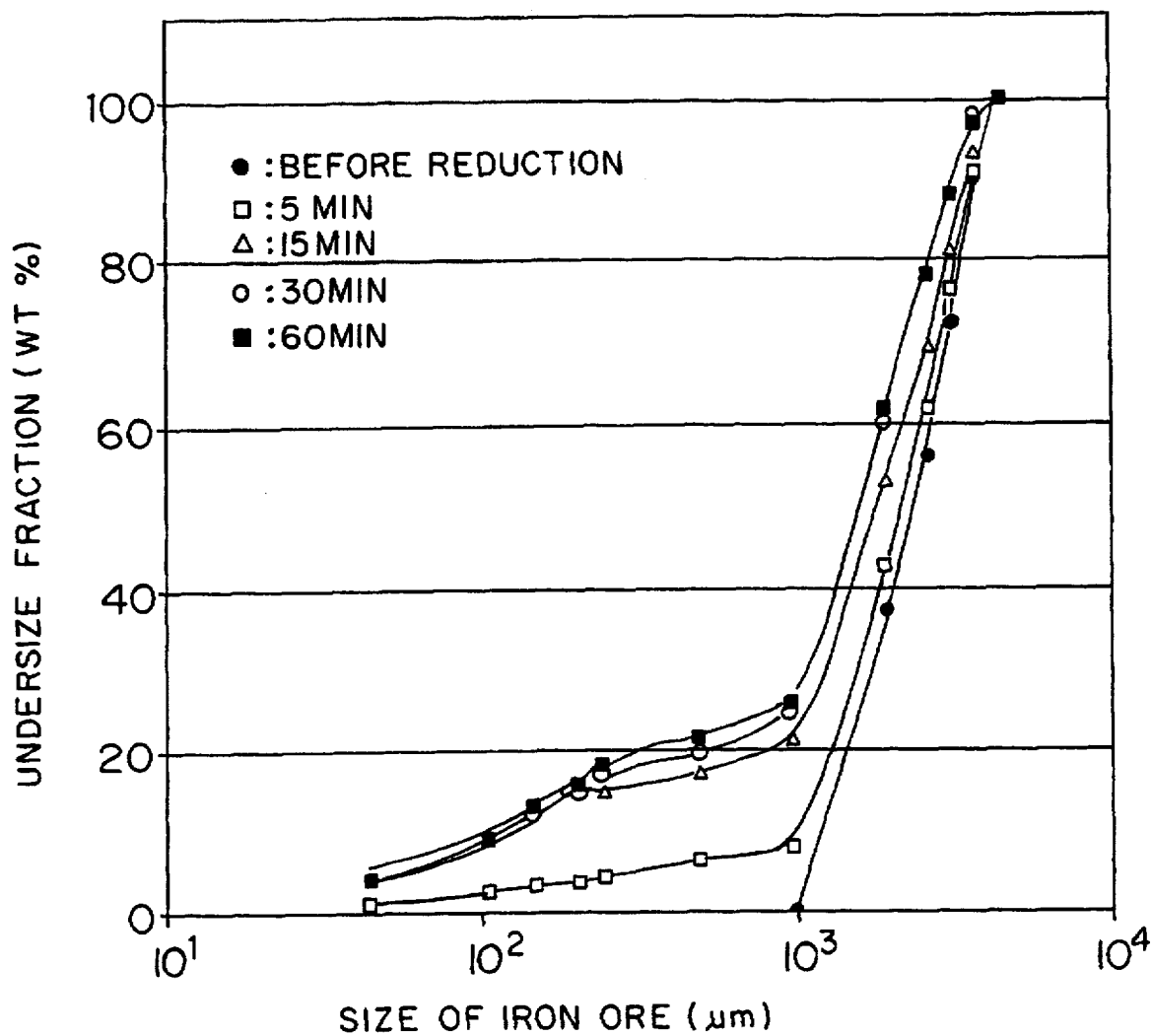
FIG. 5 is a graph illustrating the degradation of iron ore with reduction time in a fluidized bed.

Referring to FIG. 5, it can be found that the degradation of iron ores is almost completed at the early stage (in about 15 minutes) of the hot fluidizing reduction.

Figure 6:
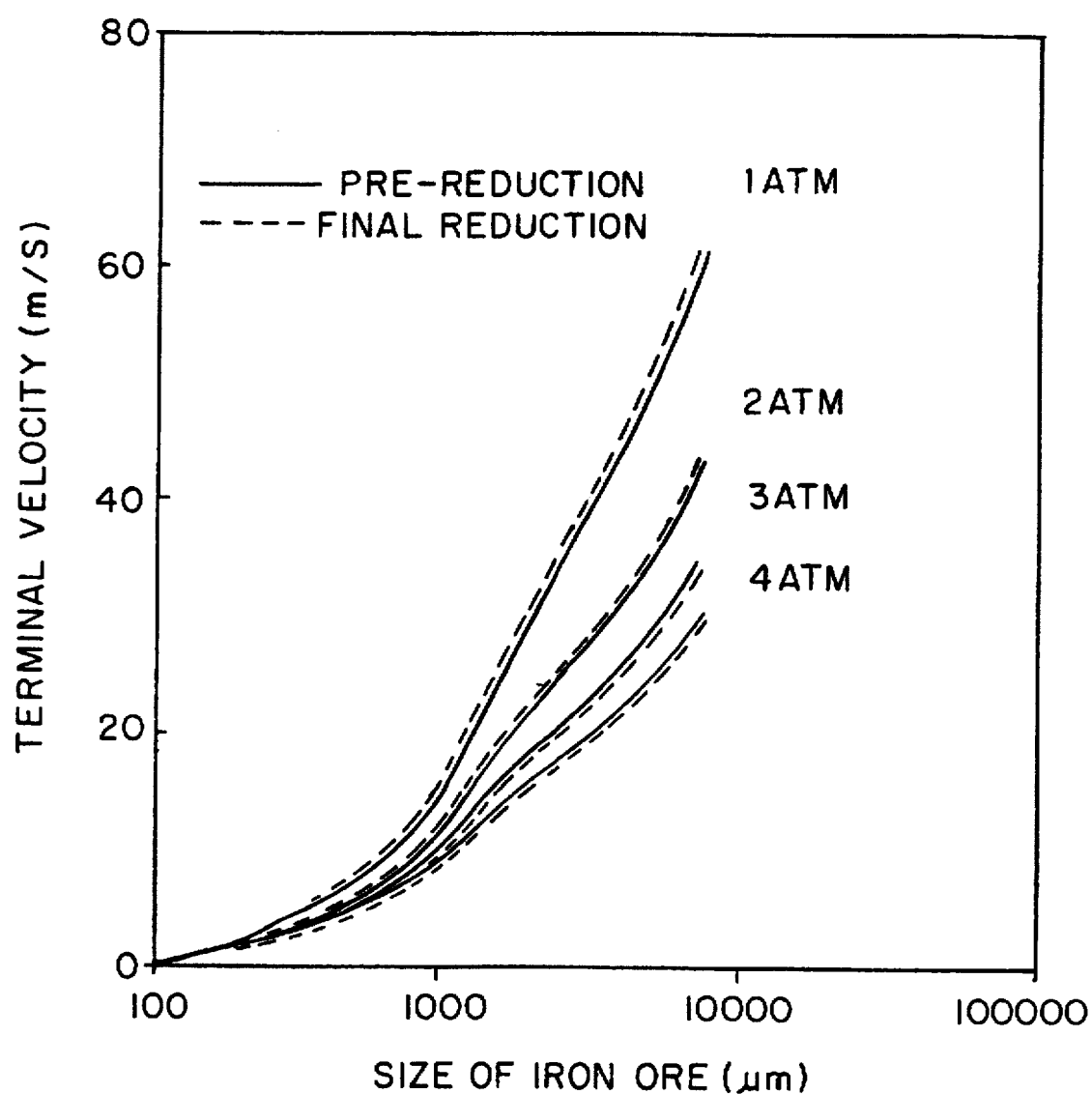
FIG. 6 is a graph illustrating variations in terminal velocity with the pressure of the reducing gas, respectively represented for the pre-reduction and final reduction at different grain sizes.

Referring to FIG. 6, it can be found that the terminal velocity in the primary reaction is nearly equal to that in the final reaction. FIG. 7 shows that the minimum fluidizing velocity required in the primary reaction is nearly equal to that required in the final reaction.

The apparatus having the construction of FIG. 4 is just the fluidized-bed-type reduction furnace made on the basis of such facts in accordance with the present invention.

EXAMPLE 4

The fluidized-bed-type reduction furnace used in this example had the construction shown in FIG. 4, which includes the drying/preheating furnace 10B for drying and preheating iron ores, the primary low-gas-velocity reduction furnace 20B for pre-reducing a medium/fine ore portion of the dried/preheated iron ores, and the secondary low-gas-velocity reduction furnace 40B for finally reducing the pre-reduced medium/fine ores. These furnaces 10B, 20B and 40B have a enlarged-upper-reduced-lower cylindrical body in which the diameter of their lower portions is smaller than those of their upper portions so as not only to obtain an active bubbling fluidization of iron ores in each reduced lower section thereof, thereby increasing the gas utilization degree, but also to decrease the gas velocity in their enlarged upper section thereof, thereby suppressing an elutriation of dusty ores. The construction also includes the primary high-gas-velocity reduction furnace 20C for pre-reducing only the coarse ore portion of the dried/preheated iron ores while elutriating the medium/fine ores, and the secondary high-gas-velocity reduction furnace 30B for finally reducing the pre-reduced coarse iron ores. These furnaces 20C and 30B have a cylindrical furnace body of a uniform diameter throughout its length.

When a reducing gas of about 850° C. is supplied to both the secondary high-gas-velocity and low-gas-velocity reduction furnaces 30B and 40B respectively through their reducing gas inlets 31B and 41B and their gas distributors 32B and 42B while charging iron ores of wide size distribution to the drying/preheating furnace 10B. The iron ores are dried and preheated while forming a bubbling fluidized bed in the furnace 10B. The dried/preheated iron ores are then fed to the primary high-gas-velocity reduction furnace 20C. In the primary high-gas-velocity reduction furnace 20C, coarse iron ores are pre-reduced in a bubbling fluidized bed while elutriating the medium/fine portion of the dried/pre-heated. The pre-reduced coarse iron ores are fed to the secondary high-gas-velocity reduction furnace 30B in which they are, in turn, finally reduced. After being finally reduced, the coarse iron ores are discharged through the third coarse ore outlet 33B. On the other hand, the medium/fine iron ores carried over from the primary high-gas-velocity reduction furnace 20C are pre-reduced in the primary low-gas-velocity reduction furnace 20B while forming a bubbling fluidized bed. After being pre-reduced, the medium/fine ores are fed to the secondary low-gas-velocity reduction furnace 40B in which they are, in turn, finally reduced. The medium/fine iron ores are then discharged through the third medium/fine ore outlet 44B.

The fluidized bed type reduction apparatus used in this example had the following dimensions:

1) Inner Diameter and Height of Each Fluidized-Bed-Type Furnace
   Drying/Preheating Furnace
      Inner Diameter of Lower Section: 0.3 m;
      Height of Lower Section: 4.0 m;
      Inner Diameter of Upper Section: 0.9 m;
      Height of Upper Section: 2.5 m;
   Primary High-Gas-Velocity Reduction Furnace
      Inner Diameter 0.2 m;
      Height 5.2 m;
   Primary Low-Gas-Velocity Reduction Furnace
      Inner Diameter of Lower Section: 0.5 m;
      Height of Lower Section: 2.7 m;
      Inner Diameter of Upper Section: 0.9 m;
      Height of Upper Section: 2.3 m;
   Secondary High-Gas-Velocity Reduction Furnace
      Inner Diameter: 0.2 m;
      Height: 5.2 m;
   Secondary Low-Gas-Velocity Reduction Furnace
      Inner Diameter of Lower Section: 0.5 m;
      Height of Lower Section: 2.7 m;
      Inner Diameter of Upper Section: 0.9 m;
      Height of Upper Section: 2.3 m.

Using the fluidized-bed-type reduction apparatus as mentioned above, the production of reduced iron and molten pig iron was carried out under the following conditions:

2) Charge and Discharge of Iron Ores
   Composition of Fine Iron Ores
      T.Fe: 62.36%, $SiO_2$: 5.65%, $Al_2O_3$: 2.91%, S: 0.007%, and P: 0.065%;
   Particle Size Distribution
      <0.25 mm=22%, 0.25 mm–1.0 mm=28%, and 1.0 mm–5.0 mm=50%;
   Feed Rate: 5 Kg/min
   Discharge Rate from Third Coarse Ore Outlet: 1.7 Kg/min
   Discharge Rate from Third Medium/Fine Ore Outlet: 2.2 Kg/min
3) Reducing Gas
   Composition: CO:65%, $H_2$: 25%, and $CO_2$+$H_2O$: 10%;
   Temperature: about 85° C.; and
   Pressure: 2.3 Kgf/cm$^2$
4) Superficial Gas Velocity in Each Furnace
   Drying/Preheating Furnace
      Superficial Gas Velocity in Lower Section: 2.22 m/s;
      Superficial Gas Velocity in Upper Section: 0.25 m/s;
   Primary High-Gas-Velocity Reduction Furnace: 3.0 m/s;
   Primary High-Gas-Velocity Reduction Furnace
      Superficial Gas Velocity in Lower Section: 0.32 m/s;
      Superficial Gas Velocity in Upper Section: 0.25 m/s;
   Secondary High-Gas-Velocity Reduction Furnace: 3.0 m/s;
   Secondary Low-Gas-Velocity Reduction Furnace
      Superficial Gas Velocity in Lower Section: 0.32 m/s;
      Superficial Gas Velocity in Upper Section: 0.25 m/s;

Under the above conditions, it was possible to maintain the iron ores at a bubbling fluidized state in each of the drying/preheating furnace 10B, primary coarse ore reduction furnace 20B, primary medium/fine ore reduction furnace 20B, secondary high-gas-velocity reduction furnace 30B and secondary low-gas-velocity reduction furnace 40B. At the primary reduction step, the iron ores were separated into a coarse ore portion and a medium/fine ore portion. These ore portions were individually subjected to the pre-reduction and final reduction. In this example, the mean gas utilization degree was about 30%, and the gas consumption rate was about 1,270 Nm$^3$/t-ore. After 60 minutes elapsed from the beginning of the reduction, reduced iron of a mean reduction degree of about 90% could be discharged through the third coarse and medium/fine ore outlets 33B and 44B.

As apparent from the above description, in accordance with the present invention, iron ores are separated in terms of the grain size after being dried and preheated in the drying/pre-heating furnace 10B. Coarse iron ores are pre-reduced in the primary high-gas-velocity reduction furnace 20B and then finally reduced in the secondary high-gas-velocity reduction furnace 30B. On the other hand, medium/fine iron ores are pre-reduced in the primary low-gas-velocity reduction furnace 203 and then finally reduced in the secondary low-gas-velocity reduction furnace 40B. Accordingly, it is possible to produce reduced iron of a relatively uniform reduction degree irrespective of the grain size of iron ores while obtaining a excellent segregation between coarse and medium/fine ores. It is also possible to supply reduced iron with an appropriate size depending on the supply plant and supply position to the melter-gasifier. The amount and grain size of the reduced iron discharged through either the third coarse ore outlet 33B or third medium/fine ore outlet 44B can be adjusted by the gas velocity of the reducing gas. The reduction degree of iron ores can be also controlled by the residence time of the iron ores in each furnace. Since all the three-stage, fluidized-bed-type reduction operations are carried out using the bubbling fluidization in accordance with the present invention, the gas utilization degree and gas consumption rate can be improved. The fluidized-bed-type reduction apparatus also has a construction capable of preventing a plugging of lines and a non-fluidization even after the operation is performed for a long period of time.

Although the-preferred embodiments of the invention have been disclosed for illustrative purposes, those skilled in the art will appreciate that various modifications, additions and substitutions are possible, without departing from the scope and basic idea of the invention as disclosed in the accompanying claims.

What is claimed is:

1. A fluidized-bed reduction apparatus for reducing fine iron ores of wide size distribution, comprising:

a drying/preheating furnace for drying and preheating fine iron ores supplied from a hopper, the drying/preheating furnace including a first gas inlet provided at a bottom portion thereof, a first gas distributor installed at a lower portion thereof, a first ore inlet provided at a side wall of the lower portion, a first coarse ore outlet provided at the side wall of the lower portion, a first medium/fine ore outlet provided at the side wall of the lower portion, and a first exhaust gas outlet provided at a side wall of an upper portion thereof;

a primary reduction furnace for pre-reducing the dried/preheated iron ores supplied from the drying/preheating furnace, the primary reduction furnace including a second gas inlet provided at a bottom portion thereof, a second gas distributor installed at a lower portion thereof, a second ore inlet provided at a side wall of the lower portion, a second coarse ore outlet provided at the side wall of the lower portion, a second medium/fine ore outlet provided at the side wall of the lower portion, and a second exhaust gas outlet provided at a side wall of an upper portion thereof;

a secondary high-gas-velocity reduction furnace for finally reducing the pre-reduced iron ores supplied from the primary reduction furnace, the secondary high-gas-velocity reduction furnace including a third gas inlet provided at a bottom portion thereof, a third gas distributor installed at a lower portion thereof, a third ore inlet provided at a side wall of the lower portion, a third coarse ore outlet provided at the side wall of the lower portion, and a third medium/fine ore outlet, which is also an outlet of exhaust gas from the secondary high-gas-velocity reduction furnace, provided at a side wall of an upper portion thereof;

a secondary low-gas-velocity reduction furnace for finally reducing iron ores elutriated from the secondary high-gas-velocity reduction furnace, the secondary low-gas-velocity reduction furnace including a fourth gas inlet provided at a bottom portion thereof, a fourth gas distributor installed in a lower portion thereof, a fourth ore inlet, which is also an inlet of gas, provided at a side wall of the lower portion, a fourth medium/fine ore outlet provided at the side wall of the lower portion, and a third exhaust gas outlet provided at a side wall of an upper portion thereof;

a first cyclone for capturing dusty iron ores contained in an exhaust gas from the drying/preheating furnace and recycling the captured dusty iron ores to the primary reduction furnace while outwardly discharging the exhaust gas, the first cyclone being connected to the first exhaust gas outlet of the drying/preheating furnace via a first exhaust gas line, being connected at a top portion thereof to a first cleaned exhaust gas line, and being connected at a bottom portion thereof to a first dusty ore discharge line;

a second cyclone for capturing dusty iron ores contained in an exhaust aas from the primary reduction furnace and recycling the captured dusty iron ores to the secondary high-gas-velocity reduction furnace while supplying the cleaned exhaust gas to the drying/preheating furnace, the second cyclone being connected to the second exhaust gas outlet of the primary reduction furnace via a second exhaust gas line, being connected at a top portion thereof to the first gas inlet of the drying/preheating furnace via a second cleaned exhaust gas line, and being connected at a bottom portion thereof to a second dusty ore discharge line;

a third cyclone for capturing dusty iron ores contained in an exhaust gas from the secondary low-gas-velocity reduction furnace and recirculating the cleaned exhaust gas to the primary reduction furnace, the third cyclone being connected to the secondary low-gas-velocity reduction furnace via a third exhaust gas line, being connected at a top portion thereof to the second gas inlet of the primary reduction furnace via a third cleaned exhaust gas line, and being connected at a bottom portion thereof to a third dusty ore discharge line;

a first duct line for connecting the first medium/fine and coarse ore outlets of the drying/preheating furnace to the second ore inlet of the primary reduction furnace so that the iron ores can be fed therethrough, and to the first duct line the first dusty ore discharge line is connected;

a second duct line for connecting the second medium/fine and coarse ore outlets of the primary reduction furnace to the third ore inlet of the secondary high-gas-velocity reduction furnace so that the iron ores can be fed therethrough, and to the second duct line the second dusty ore discharge line is connected;

a third medium/fine ore discharge line for connecting the third medium/fine ore outlet to the fourth ore inlet of the secondary low-gas-velocity reduction furnace so that the iron ores can be fed therethrough; and a third duct line connected to the fourth medium/fine ore outlet of the secondary low-gas-velocity reduction furnace and to the third dusty ore outlet.

2. The fluidized-bed reduction apparatus in accordance with claim 1, wherein each lower portion of the drying/ preheating furnace and the first reduction furnace has an inner diameter equal to 1.2 to 1.8 times the inner diameter of the secondary high-gas-velocity reduction furnace and each upper portion of them has an inner diameter equal to about 3.5 to 5.0 times the inner diameter of the secondary high-gas-velocity reduction furnace, and the lower portion of the secondary low-gas-velocity reduction furnace has an inner diameter equal to about 2.0 to 3.0 times the inner diameter of the secondary high-gas-velocity reduction furnace and the upper portion of the furnace has an inner diameter equal to about 2.8 to 4.0 times the inner diameter of the secondary high-gas-velocity reduction furnace.

3. The fluidized-bed reduction apparatus in accordance with claim 1 or 2, wherein each lower portion of the drying/preheating furnace, the primary reduction furnace and the secondary low-gas-velocity reduction furnace has a height equal to 7.0 to 12.0 times its inner diameter and each upper portion of them has a height equal to 2.0 to 4.0 times its inner diameter, and the secondary high-gas-velocity reduction furnace has a height equal to 20 to 30 times its inner diameter thereof.

4. The fluidized-bed reduction apparatus in accordance with claim 1 or 2, wherein each of the drying/preheating furnace and the primary reduction furnace comprises a cylindrical body including an enlarged upper section, a first tapered section increasing in diameter from its lower end to its upper end, an intermediate section having a diameter smaller than the upper section, a second tapered section increasing in diameter from its lower end to its upper end, and a reduced lower section having a diameter smaller than the intermediate section, and the secondary high-gas-velocity reduction furnace comprises a cylindrical body including an enlarged upper section, a tapered section increasing in diameter from its lower end to its upper end, and a reduced lower section.

5. The fluidized-bed reduction apparatus in accordance with claim 3, wherein each of the drying/preheating furnace and the primary reduction furnace comprises a cylindrical body including an enlarged upper section, a first tapered section increasing in diameter from its lower end to its upper end, an intermediate section having a diameter smaller than the upper section, a second tapered section increasing in diameter from its lower end to its upper end, and a reduced lower section having a diameter smaller than the intermediate section, and the secondary high-gas-velocity reduction furnace comprises a cylindrical body including an enlarged upper section, a tapered section increasing in diameter from its lower end to its upper end, and a reduced lower section.

6. The fluidized-bed reduction apparatus in accordance with claim 1 or 2, wherein the third coarse ore outlet and the third duct line are connected to a melter gasifier so that iron ores can be discharged into the melter gasifier, and the third gas inlet of the secondary high-gas-velocity reduction furnace and the fourth gas inlet of the secondary low-gas-velocity reduction furnace are connected to the melter gasifier so that exhaust gas from the melter gasifier can be supplied to the secondary high-gas-velocity and low-gas-velocity reduction furnaces.

7. The fluidized-bed reduction apparatus in accordance with claim 4, wherein the third coarse ore outlet and the third duct line are connected to a melter gasifier such that iron ores are discharged into the melter gasifier, and the third gas inlet of the secondary high-gas-velocity reduction furnace and the fourth gas inlet of the secondary low-gas-velocity reduction furnace are connected to the melter gasifier so that exhaust gas from the melter gasifier is supplied to the secondary high-gas-velocity and low-gas-velocity reduction furnaces.

8. The fluidized-bed reduction apparatus in accordance with claim 5, wherein the third coarse ore outlet and the third duct line are connected to a melter gasifier so that iron ores can be discharged into the melter gasifier, and the third gas inlet of the secondary high-gas-velocity reduction furnace and the fourth gas inlet of the secondary low-gas-velocity reduction furnace are connected to the melter gasifier so that exhaust gas from the melting furnace can -be supplied to the secondary high-gas-velocity and low-gas-velocity reduction furnaces.

9. The fluidized-bed reduction apparatus in accordance with claim 1 or 2, further comprising an inner cyclone installed in the upper portion of the secondary low-gas-velocity reduction furnace and connected to the third cyclone via the third exhaust gas line extending through the third exhaust gas outlet.

10. The fluidized-bed reduction apparatus in accordance with claim 3, further comprising an inner cyclone installed in the upper portion of the secondary low-gas-velocity reduction furnace and connected to the third cyclone via the third exhaust gas line extending through the third exhaust gas outlet.

11. The fluidized-bed reduction apparatus in accordance with claim 4, further comprising an inner cyclone installed in the upper portion of the secondary low-gas-velocity reduction furnace and connected to the third cyclone via the third exhaust gas line extending through the third exhaust gas outlet.

12. The fluidized-bed reduction apparatus in accordance with claim 5, further comprising an inner cyclone installed in the upper portion of the secondary low-gas-velocity reduction furnace and connected to the third cyclone via the third exhaust gas line extending through the third exhaust gas outlet.

13. The fluidized-bed reduction apparatus in accordance with claim 6, further comprising an inner cyclone installed in the upper portion of the secondary low-gas-velocity reduction furnace and connected to the third cyclone via the third exhaust gas line extending through the third exhaust gas outlet.

14. The fluidized-bed reduction apparatus in accordance with claim 7, further comprising an inner cyclone installed in the upper portion of the secondary low-gas-velocity reduction furnace and connected to the third cyclone via the third exhaust gas line extending through the third exhaust gas outlet.

15. The fluidized-bed reduction apparatus in accordance with claim 1 or 2, further comprising first and second purging gas lines connected to bended portions of the first and second duct lines for supplying a small amount of purging gas to each corresponding line.

16. The fluidized-bed reduction apparatus in accordance with claim 3, further comprising first and second purging gas lines connected to bended portions of the first and second duct lines for supplying a small amount of purging gas to each corresponding line.

17. The fluidized-bed reduction apparatus in accordance with claim 4, further comprising first and second purging gas lines connected to bended portions of the first and second duct lines for supplying a small amount of purging gas to each corresponding line.

18. The fluidized-bed reduction apparatus in accordance with claim 5, further comprising first and second purging gas lines connected to bended portions of the first and second duct lines for supplying a small amount of purging gas to each corresponding line.

19. The fluidized-bed reduction apparatus in accordance with claim 6, further comprising first and second purging gas lines connected to bended portions of the first and second duct lines for supplying a small amount of purging gas to each corresponding line.

20. The fluidized-bed reduction apparatus in accordance with claim 7, further comprising first and second purging gas lines connected to bended portions of the first and second circulation lines for supplying a small amount of purging gas to each corresponding line.

21. The fluidized-bed reduction apparatus in accordance with claim 9, further comprising first and second purging gas lines connected to bended portions of the first and second circulation lines for supplying a small amount of purging gas to each corresponding line.

22. The fluidized-bed reduction apparatus in accordance with claim 10, further comprising first and second purging gas lines connected to bended portions of the first and second circulation lines for supplying a small amount of purging gas to each corresponding line.

23. The fluidized-bed reduction apparatus in accordance with claim 14, further comprising first and second purging gas lines connected to bended portions of the first and second circulation lines for supplying a small amount of purging gas to each corresponding line.

24. A fluidized-bed reduction apparatus for reducing iron ores of wide size distribution, comprising:

a drying/preheating furnace for drying and preheating iron ores supplied from a hopper by an exhaust gas from a second cyclone while forming a bubbling fluidized bed of the iron ores;

a first cyclone for capturing dusty iron ores contained in an exhaust gas from the drying/pre-heating furnace;

a primary high-gas-velocity reduction furnace for pre-reducing only a coarse ore portion of the dried/preheated iron ores discharged from the drying/preheating furnace at a bubbling fluidized state by an exhaust gas from a fourth cyclone while forming a bubbling fluidized bed of the coarse iron ores, the primary high-gas-velocity reducing furnace also elutriating a medium/fine ore portion of the dried/preheated iron ores by the exhaust gas from the fourth cyclone;

a primary low-gas-velocity reduction furnace for pre-reducing the medium/fine iron ores carried over to a lower portion thereof via the primary high-gas-velocity reduction furnace and a first medium/fine ore discharge line by an exhaust gas from a third cyclone while forming a bubbling fluidized bed of the medium/fine iron ores;

the second cyclone for capturing dusty iron ores contained in exhaust gas from the primary low-gas-velocity reduction furnace; the second cyclone re-circulating the captured dusty iron ores to the second medium/fine ore discharge line which is connected to the ore inlet of the primary low-gas-velocity reduction furnace or directly re-circulating to a lower portion of the secondary low-gas-velocity reduction furnace;

a secondary high-gas-velocity reduction furnace for finally reducing the pre-reduced coarse iron ores discharged from the primary high-gas-velocity reduction furnace by an exhaust gas from a melter gasifier while forming a bubbling fluidized bed of the pre-reduced coarse iron ores;

a secondary low-gas-velocity reduction furnace for finally reducing the pre-reduced medium/fine iron ores discharged from the primary low-gas-velocity reduction furnace by the exhaust gas from the melter gasifier while forming a bubbling fluidized bed of the pre-reduced medium/fine iron ores;

the third cyclone for capturing dusty iron ores contained in an exhaust gas from the secondary medium/fine ore reduction furnace, the third cyclone re-circulating the captured dusty iron ores to the lower portion of the secondary low-gas-velocity reduction furnace or directly discharging the captured dusty iron ores to a lower portion of the melter gasifier; and the fourth cyclone for, capturing dusty ores contained in an exhaust gas discharged from the secondary high-gas-velocity reduction furnace, the fourth cyclone re-circulating the captured dusty iron ores to the lower portion of the secondary low-gas-velocity reduction furnace or directly discharging the captured dusty iron ores to a lower portion of the melter gasifier.

25. A fluidized-bed reduction apparatus for reducing fine iron ores of wide size distribution, comprising:

a drying/preheating furnace for drying and preheating iron ores supplied from a hopper, the drying/preheating furnace including a first gas inlet provided at a bottom portion thereof, a first gas distributor installed at a lower portion thereof, a first ore inlet provided at a side wall of the lower portion, a first coarse ore outlet provided at the side wall of the lower portion, a first medium/fine ore outlet provided at the side wall of the lower portion, and a first exhaust gas outlet provided at a side wall of an upper portion thereof;

a primary high-gas-velocity reduction furnace for pre-reducing a coarse ore portion of the dried/preheated iron ores supplied from the drying/preheating furnace at a bubbling fluidized state while elutriating a medium/fine ore portion of the dried/preheated iron ores, the primary high-gas-velocity reduction furnace including a third gas inlet provided at a bottom portion thereof, a third gas distributor installed at a lower portion thereof, a third ore inlet provided at a side wall of the lower portion, a third coarse ore outlet provided at the side wall of the lower portion, a second medium/fine ore outlet, which is also an outlet of exhaust gas from the primary high-gas-velocity reduction furnace provided at the side wall of an upper portion thereof, and a third ore inlet provided at the side wall of the lower portion;

a primary reduction furnace for pre-reducing the dried/preheated iron ores supplied from the drying/preheating furnace, the primary reduction furnace including a second gas inlet provided at a bottom portion thereof, a second gas distributor installed at a lower portion thereof, a second ore inlet provided at a side wall of the lower portion, a second coarse ore outlet provided at the side wall of the lower portion, a second medium/fine ore outlet provided at the side wall of the lower portion, and a second exhaust gas outlet provided at a side wall of an upper portion thereof;

a primary low-gas-velocity reduction furnace for pre-reducing iron ores carried over from the primary high-gas-velocity reduction furnace while forming a bubbling fluidized bed thereof, the primary low-gas-velocity reduction furnace including a second gas inlet provided at a bottom portion thereof, a second gas distributor installed at a lower portion thereof, a second medium/fine ore outlet provided at the side wall of the lower portion, and a second exhaust gas outlet provided at a side wall of an upper portion thereof;

a secondary high-gas-velocity reduction furnace for finally reducing the pre-reduced coarse iron ores supplied from the primary high-gas-velocity reduction furnace, the secondary high-gas-velocity reduction furnace including a fourth gas inlet provided at a bottom portion thereof, a fourth gas distributor installed in a lower portion thereof, a fourth ore inlet provided at a side wall of the lower portion, a third coarse ore outlet provided at the side wall of the lower portion, and a third exhaust gas outlet provided at a side wall of an upper portion thereof;

a secondary low-gas-velocity reduction furnace for finally reducing the medium/fine iron ores supplied from the primary low-gas-velocity reduction furnace, the secondary low-gas-velocity reduction furnace including a fifth gas inlet provided at a bottom portion thereof, a fifth gas distributor installed in a lower portion thereof, a fifth ore inlet provided at a side wall of the lower portion, a sixth ore inlet provided at a side of the lower portion, a third medium/fine ore outlet provided at the side wall of the lower portion, and a fourth exhaust gas outlet provided at a side wall of an upper portion thereof;

a first cyclone for capturing dusty iron ores contained in an exhaust gas discharged from the drying/preheating furnace and recirculating the collected dusty iron ores to the primary high-gas-velocity reduction furnace while outwardly discharging the cleaned exhaust gas, the first cyclone being connected to the first exhaust gas outlet of the drying/preheating furnace via a first exhaust gas discharge line, being connected at a top portion thereof to a first cleaned exhaust gas line, and being connected at a bottom portion thereof to a first dusty ore discharge line;

a second cyclone for capturing dusty iron ores contained in an exhaust gas discharged from the primary low-gas-velocity reduction furnace and recycling the captured dusty iron ores to the primary low-gas-velocity reduction furnace or the secondary low-gas-velocity reduction furnace while supplying the cleaned exhaust gas to the drying/preheating furnace, the second cyclone being connected to the second exhaust gas outlet of the primary low-gas-velocity reduction furnace via a second exhaust gas line, being connected at a top portion thereof to the first gas inlet of the drying/preheating furnace via a second cleaned exhaust gas line, and being connected at a bottom portion thereof to a second dusty ore discharge line;

a third cyclone for capturing dusty iron ores contained in an exhaust gas discharged from the secondary low-gas-velocity reduction furnace and recycling the captured dusty iron ores to the secondary low-gas-velocity reduction furnace or directly charging to a melter gasifier while supplying the cleaned exhaust gas to the primary low-gas-velocity reduction furnace, the third cyclone being connected to the secondary low-gas-velocity reduction furnace via a third exhaust gas line, being connected at a top portion thereof to the second gas inlet of the primary low-gas-velocity reduction furnace via a third cleaned exhaust gas line, and being connected at a bottom portion thereof to a third dusty ore discharge line;

a fourth cyclone for capturing dusty iron ores contained in an exhaust gas discharged from the secondary high-gas-velocity reduction furnace and supplying the captured dusty iron ores to the secondary low-gas-velocity reduction furnace or a melter gasifier while supplying the cleaned exhaust gas to the primary high-gas-velocity reduction furnace, the fourth cyclone being connected to the secondary high-gas-velocity reduction furnace via a fourth exhaust gas line, being connected at a top portion thereof to the third gas inlet of the primary high-gas-velocity reduction furnace via a fourth cleaned exhaust gas line, and being connected at a bottom portion thereof to a fourth dusty ore discharge line;

a first duct line for connecting the first medium/fine and coarse ore outlets of the drying/preheating furnace to the second ore inlet of the primary high-gas-velocity reduction furnace, and to the first duct line the first dusty ore discharge line is connected;

a first coarse ore discharge line for connecting the second coarse ore outlet of the primary high-gas-velocity reduction furnace to the fourth ore inlet of the secondary high-gas-velocity reduction furnace;

a first medium/fine ore discharge line for connecting the third medium/fine ore outlet of the primary high-gas-velocity reduction furnace to the second ore inlet of the primary low-gas-velocity reduction furnace;

a second coarse ore discharge line for connecting the third coarse ore outlet of the secondary high-gas-velocity reduction furnace to the melter gasifier;

a second medium/fine ore discharge line for connecting the second medium/fine ore outlet of the primary low-gas-velocity reduction furnace to the sixth ore inlet, and to the second medium/fine ore discharge line being connected to the second dusty ore discharge line in connected;

a third medium/fine ore discharge line for connecting the fourth medium/fine ore outlet of the secondary medium/fine ore reduction furnace to the melter gasifier, a second duct line for connecting the fourth dusty ore discharge line to the third medium/fine ore discharge line, the second duct line being connected to the third dusty ore discharge line;

the third and fourth dusty ore discharge lines being intersect with each other;

a bi-directional discharge valve provided at the intersection between the third and fourth dusty ore discharge lines; and another bi-directional discharge valve provided at the connection between the second duct line and fourth dusty ore discharge line.

26. The fluidized-bed reduction apparatus in accordance with claim 25, further comprising purging gas lines connected to bended portions of the first circulation line, first coarse ore discharge line and second medium/fine ore discharge lines for supplying a small amount of purging gas to the corresponding lines, respectively.

27. The fluidized-bed reduction apparatus in accordance with any one of claims 24, 25 or 26, wherein the primary high-gas-velocity reduction furnace has the same shape and size as the secondary high-gas-velocity reduction furnace, and the primary low-gas-velocity reduction furnace has the same shape and size as the secondary low-gas-velocity reduction furnace.

28. The fluidized-bed reduction apparatus in accordance with any one of claims 24, 25 or 26, wherein each lower portion of the drying/preheating furnace, the primary low-gas-velocity reduction furnace and the secondary low-gas-velocity reduction furnace each has a height equal to 7 to 12 times the inner diameter of its lower portion and each upper portion of them has a height equal to 2 to 4 times its inner diameter, and the primary and secondary high-gas-velocity reduction furnaces each has a height equal to 20 to 30 times its inner diameter thereof.

29. The fluidized-bed reduction apparatus in accordance with claim 27, wherein each lower portion of the drying/ preheating furnace, the primary low-gas-velocity reduction furnace and the secondary low-gas-velocity reduction furnace has a height equal to 7 to 12 times its inner diameter and each upper portion of them has a height equal to 2 to 4 times its inner diameter, and each of the primary and secondary high-gas-velocity reduction furnaces has a height equal to 20 to 30 times its inner diameter thereof.

30. The fluidized-bed reduction apparatus in accordance with any one of claims 24, 25 or 26, further comprising an inner cyclone installed in the upper portion of the secondary low-gas-velocity reduction furnace and connected to the third cyclone via the third exhaust gas line.

31. The fluidized-bed reduction apparatus in accordance with claims 27, further comprising an inner cyclone installed in the upper portion of the secondary low-gas-velocity reduction furnace and connected to the third cyclone via the third exhaust gas line.

32. The fluidized-bed reduction apparatus in accordance with claims 28, further comprising an inner cyclone installed in the upper portion of the secondary low-gas-velocity reduction furnace and connected to the third cyclone via the third exhaust gas line.

33. The fluidized-bed reduction apparatus in accordance with claims 29, further comprising an inner cyclone installed in the upper portion of the secondary low-gas-velocity reduction furnace and connected to the third cyclone via the third exhaust gas line.

34. A method for reducing iron ores using a fluidized-bed reduction apparatus, said iron ores containing a coarse ore portion and a medium/fine ore portion, said method comprising the steps of:

drying and preheating iron ores supplied from a hopper in a drying/preheating furnace to produce a dried/ preheated iron ore;

pre-reducing the dried/preheated iron ore in a primary reduction furnace to produce a pre-reduced iron ore;

finally reducing the coarse ore portion of the pre-reduced iron ore in a secondary high-gas-velocity reduction furnace while forming a bubbling fluidized bed thereof; and finally reducing a medium/fine ore portion of the pre-reduced iron ore in a secondary low-gas-velocity reduction furnace while forming a bubbling fluidized bed thereof.

35. The method in accordance with claim 34, wherein the gas velocity in each lower portion of the drying/preheating furnace, the primary reduction furnace and the secondary low-gas-velocity reduction furnace is equal to 1.5 to 3.0 times the minimum fluidizing velocity of the iron ores to be charged in a fluidized bed of each associated furnace, the gas velocity of gas in each upper portion of the furnaces, however, is lower than the terminal velocity o f the iron ores being elutriated, wherein gas velocity in the secondary high-gas-velocity reduction furnace is equal to 1.5 to 3.0 times the minimum fluidizing velocity of the coarse iron ores.

36. The method in accordance with claim 34 or 35, wherein the pressure and temperature of gas supplied to either the secondary low-gas-velocity reduction furnace or the secondary high-gas-velocity reduction furnace are 2 to 4 atm. and 800° to 900° C., respectively, the pressure and temperature drops occurring in each of the drying/preheating furnace, the secondary high-gas-velocity reduction furnace and the secondary low-gas-velocity reduction furnace are 0.3 to 0.6 atm. and 30° to 80° C., respectively, and the residence time of the iron ores in each furnace is 20 to 40 minutes.

37. A method for reducing iron ores using a fluidized-bed reduction apparatus, said iron ores containing a coarse ore portion and a medium/fine ore portion, said method comprising the steps of:

drying and preheating iron ores supplied from a hopper in a drying/preheating furnace to produce a dried/ preheated iron ore;

pre-reducing the coarse ore portion of the dried/preheated iron ore in a primary high-gas-velocity reduction furnace while forming a bubbling fluidized bed thereof to produce a pre-reduced iron ore;

pre-reducing the medium/fine ore portion of the dried/ preheated iron ore in a primary low-gas-velocity reduction furnace;

finally reducing the pre-reduced coarse iron ore in a secondary high-gas-velocity reduction furnace while forming a bubbling fluidized bed thereof; and finally reducing the pre-reduced medium/fine iron ore in a secondary low-gas-velocity reduction furnace while forming a bubbling fluidized bed thereof.

38. The method in accordance with claim 37, wherein the gas velocity in each lower portion of the drying/preheating furnace, the primary low-gas-velocity reduction furnace and the secondary low-gas-velocity reduction furnace is equal to 1.5 to 3.0 times the minimum fluidizing velocity of the iron ores to be charged in a fluidized bed of each associated furnace, the gas velocity of gas in each upper portion of the furnaces, however, is lower than the terminal velocity of the iron ores being elutriated, and the gas velocity in either the primary high-gas-velocity reduction furnace or the secondary high-gas-velocity reduction furnace is equal to 1.5 to 3.0 times the minimum fluidizing velocity of the coarse iron ores.

39. The method in accordance with claim 37 or 38, wherein the pressure and temperature of gas supplied to either the secondary high-gas-velocity reduction furnace or the secondary low-gas-velocity reduction furnace are 2 to 4 atm. and 800° to 900° C., respectively, the pressure and temperature drops occurring in each of the drying/preheating furnace, the primary low-gas-velocity reduction furnace, the primary high-gas-velocity reduction furnace, the secondary high-gas-velocity reduction furnace and the secondary low-gas-velocity reduction furnace are 0.3 to 0.6 atm. and 30° to 80° C., respectively and the residence time of the iron ores in each furnace is 20 to 40 minutes.

40. The fluidized-bed reduction apparatus in accordance with claim 8, further comprising an inner cyclone installed in the upper portion of the secondary low-gas-velocity reduction furnace and connected to the cyclone via the third exhaust gas line extending through the third exhaust gas outlet.

41. The fluidized-bed reduction apparatus in accordance with claim 8, further comprising first and second purging gas line connected to bended portions of the first and second circulation lines for supplying a small amount of purging gas to each corresponding line.

42. The fluidized-bed reduction apparatus in accordance with claim 11 further comprising first and second purging gas line connected to bended portions of the first and second circulation lines for supplying a small amount of purging gas to each corresponding line.

43. The fluidized-bed reduction apparatus in accordance with claim 12, further comprising first and second purging gas line connected to bended portions of the first and second circulation lines for supplying a small amount of purging gas to each corresponding line.

44. The fluidized-bed reduction apparatus in accordance with claim 13, further comprising first and second purging gas lines connected to bended portions of the first and second circulation lines for supplying a small amount of purging gas to each corresponding line.

* * * * *

UNITED STATES PATENT AND TRADEMARK OFFICE
CERTIFICATE OF CORRECTION

PATENT NO. : 5,762,681
DATED : June 9, 1998
INVENTOR(S) : Il Ock Lee et al.

It is certified that error appears in the above-identified patent and that said Letters Patent is hereby corrected as shown below:

Column 3 Line 37 "second-cyclone" should read --second cyclone-- (delete hyphen).

Column 8 Line 21 "second tapered Section" should read --second tapered section--.

Column 9 Lines 9-10 "furnaces 10 and is" should read --furnaces 10 and 20 is--.

Column 9 Line 12 "furnaces 10 and becomes" should read --furnaces 10 and 20 becomes--.

Column 11 Line 61 "can be red" should read --can be fed--.

Column 12 Line 3 "under section" should read --upper section--.

Column 13 Line 58 "equal to 20 to times" should read --equal to 20 to 30 times--.

Column 19 Line 39 "0.70 mn" should read --0.70 m--.

Column 20 Line 34 after "distributed" delete hyphen (-).

Column 22 Line 35 "85°C" should read --850°C--.

Column 23 Line 7 "furnace 203" should read --furnace 20B--.

Column 23 Line 28 "the-preferred" should read --the preferred--.

Claim 1 Column 24 Line 25 "exhaust aas" should read --exhaust gas--.

Claim 8 Column 26 Line 8 "can -be" should read --can be--.

UNITED STATES PATENT AND TRADEMARK OFFICE
CERTIFICATE OF CORRECTION

PATENT NO. : 5,762,681
DATED : June 9, 1998
INVENTOR(S) : Il Ock Lee et al.

It is certified that error appears in the above-identified patent and that said Letters Patent is hereby corrected as shown below:

Claim 24 Column 27 Line 31 "drying/pre-heating" should read --drying/preheating--.

Claim 24 Column 28 Line 8 between "for" and "capturing" delete comma --,--.

Claim 40 Column 32 Line 53 after "connected to the" insert --third--.

Claim 41 Column 32 Lines 57-58 "gas line" should read --gas lines--.

Claim 42 Column 32 Line 63 "gas line" should read --gas lines--.

Claim 43 Column 33 Line 1 "gas line" should read --gas lines--.

Signed and Sealed this

Twenty-seventh Day of October, 1998

Attest:

BRUCE LEHMAN

*Attesting Officer*     *Commissioner of Patents and Trademarks*